United States Patent
Deng et al.

(10) Patent No.: US 11,732,767 B2
(45) Date of Patent: Aug. 22, 2023

(54) ELECTRIC BRAKE

(71) Applicant: Honeywell International Inc., Charlotte, NC (US)

(72) Inventors: Fangmin Deng, Changsha (CN); Bin Wang, Changsha (CN)

(73) Assignee: Honeywell International Inc., Charlotte, NC (US)

( * ) Notice: Subject to any disclaimer, the term of this patent is extended or adjusted under 35 U.S.C. 154(b) by 255 days.

(21) Appl. No.: 17/135,237

(22) Filed: Dec. 28, 2020

(65) Prior Publication Data

US 2022/0205497 A1    Jun. 30, 2022

(51) Int. Cl.
| | |
|---|---|
| *F16D 55/38* | (2006.01) |
| *B64C 25/44* | (2006.01) |
| *F16D 65/18* | (2006.01) |
| *F16D 121/24* | (2012.01) |
| *F16D 125/40* | (2012.01) |
| *F16D 125/48* | (2012.01) |
| *F16H 25/22* | (2006.01) |
| *F16H 37/12* | (2006.01) |
| *F16H 49/00* | (2006.01) |

(52) U.S. Cl.
CPC .............. *F16D 55/38* (2013.01); *B64C 25/44* (2013.01); *F16D 65/18* (2013.01); *F16D 2121/24* (2013.01); *F16D 2125/40* (2013.01); *F16D 2125/48* (2013.01); *F16H 25/2204* (2013.01); *F16H 37/124* (2013.01); *F16H 49/001* (2013.01); *F16H 2049/003* (2013.01); *F16H 2702/00* (2013.01)

(58) Field of Classification Search
CPC ........ F16D 55/38; F16D 65/18; F16H 37/124; B64C 25/44
See application file for complete search history.

(56) References Cited

U.S. PATENT DOCUMENTS

| | | | |
|---|---|---|---|
| 6,153,988 | A | 11/2000 | Reimann et al. |
| 6,220,115 | B1 | 4/2001 | Hirn et al. |

(Continued)

FOREIGN PATENT DOCUMENTS

| | | | |
|---|---|---|---|
| CN | 103287408 | A | 9/2013 |
| CN | 104806669 | A  * | 7/2015 |

(Continued)

OTHER PUBLICATIONS

Response to Extended Search Report dated May 16, 2022, from counterpart European Application No. 21215155.9 filed Jul. 5, 2022, 16 pp.

(Continued)

*Primary Examiner* — Vishal R Sahni
(74) *Attorney, Agent, or Firm* — Shumaker & Sieffert, P.A.

(57) ABSTRACT

In some examples, a brake assembly includes an actuator assembly configured to cause the translation of a piston to compress a disc stack. The actuator assembly is configured to generate a first torque around a motor axis using a motor and generate a second torque from the first torque using a harmonic drive. The actuator assembly may include a gear set configured to cause a linear actuator to translate the piston using the second torque. In some examples, the actuator is configured to translate the piston along a compression axis different from the motor axis.

20 Claims, 8 Drawing Sheets

(56) References Cited

U.S. PATENT DOCUMENTS

| | | |
|---|---|---|
| 6,367,593 B1 | 4/2002 | Siler et al. |
| 7,527,130 B2 | 5/2009 | Baudendistel et al. |
| 7,565,953 B2 | 7/2009 | Dalton et al. |
| 8,657,080 B2 | 2/2014 | Constans |
| 8,997,946 B2 | 4/2015 | Haydon et al. |
| 9,114,791 B2 | 8/2015 | Selles et al. |
| 9,140,342 B2 | 9/2015 | Hoebel et al. |
| 9,233,752 B2 | 1/2016 | Walitzki et al. |
| 9,605,723 B2 | 3/2017 | Rehfus et al. |
| 2005/0247529 A1* | 11/2005 | Gaines .................. F16D 65/18 188/72.8 |
| 2006/0042889 A1 | 3/2006 | Linden et al. |
| 2007/0074938 A1* | 4/2007 | Cho ....................... F16D 65/18 188/162 |
| 2008/0135349 A1 | 6/2008 | Himes et al. |
| 2009/0284089 A1 | 11/2009 | Wingett et al. |
| 2010/0038478 A1* | 2/2010 | Knight ................ B64C 25/505 244/102 R |
| 2010/0163351 A1* | 7/2010 | Sakashita ............... F16D 65/18 188/182 |
| 2011/0132704 A1 | 6/2011 | Hanlon et al. |
| 2013/0048443 A1 | 2/2013 | Muramatsu et al. |
| 2014/0090933 A1* | 4/2014 | Sakashita ............. F16D 65/567 188/72.4 |
| 2017/0241526 A1 | 8/2017 | Drennen et al. |
| 2017/0297434 A1* | 10/2017 | Kaneda .................. F16D 55/22 |
| 2017/0343065 A1* | 11/2017 | Okada .................... F16D 65/18 |
| 2021/0310528 A1* | 10/2021 | Deng ..................... F16D 55/36 |
| 2022/0205497 A1* | 6/2022 | Deng ..................... F16D 55/38 |

FOREIGN PATENT DOCUMENTS

| | | |
|---|---|---|
| CN | 104806669 B | 7/2015 |
| DE | 29614738 U1 | 10/1996 |
| EP | 3889040 A1 | 10/2021 |
| JP | 4602188 B2 | 12/2010 |

OTHER PUBLICATIONS

Extended Search Report from counterpart European Application No. 21215155.9, dated May 16, 2022, 9 pp.

\* cited by examiner

ELECTRIC BRAKE

TECHNICAL FIELD

The present disclosure relates to brake assemblies of a vehicle.

BACKGROUND

Vehicles, such as aircrafts, may use a wheel brake assembly that includes a multi-disc brake assembly. For example, the multi-disc brake assembly may include a disc stack comprising plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake assembly may displace pistons against a pressure plate to compress the rotating rotor discs engaged with the wheel against the stationary stator discs, therefore producing torque that decelerates the rotational motion of the wheel.

SUMMARY

In some examples, the disclosure describes articles, systems, and techniques relating to a brake assembly of a vehicle. The brake assembly includes a motor and a harmonic drive configured to transfer a torque generated by the motor to a brake disc stack. The brake assembly may include a disc stack configured to reduce and/or prevent a rotation of a wheel when the disc stack is compressed, a piston configured to exert a compression force on the disc stack, and an actuator configured to linearly translate the piston using the shaft rotation of a motor. The actuator may be configured to transfer a torque produced by the motor to a linear actuator using the harmonic drive. In some examples, the motor generates the shaft rotation around a motor axis and the linear actuator translates the piston along a compression axis different from (e.g., displaced from) the motor axis. A displacement between the motor axis and the separate compression axis allows for a more compact actuator configuration as compared to in-line actuators where a single axis serves as both the motor axis and the compression axis.

In an example, a brake assembly comprises: a brake disc stack; an actuator assembly comprising: an electric motor configured to generate a first rotary torque around a motor axis; a harmonic drive configured to generate a second rotary torque in response to the first rotary torque; a gear set comprising an output gear configured to rotate in response to the second rotary torque; and a linear actuator mechanically coupled with the gear set, wherein the linear actuator is configured to generate linear motion along a compression axis and cause a piston to compress the brake disc stack when the output gear rotates, wherein the compression axis is different than the motor axis.

In an example, a brake assembly comprises: a disc stack; a piston configured to compress the disc stack; an electric motor including a motor housing and a motor shaft, wherein the electric motor is configured to rotate the motor shaft around a motor axis at a first speed and in a first direction relative to the motor housing; a harmonic drive mechanically engaged with the motor shaft, wherein the harmonic drive is configured to cause an flexible spline to rotate around the motor axis at a rotational speed less than the first speed and in a second direction opposite the first direction; an output gear configured to rotate around a compression axis, wherein the flexible spline is configured to cause the rotation of the output gear; and a linear actuator comprising a driver and a screw, wherein the output gear is configured to cause a rotation of the driver, and wherein the rotation of the driver causes the screw to translate relative to the motor housing along the compression axis to cause the piston to compress the disc stack.

In an example, a method comprises: generating a first rotary torque around a motor axis using an electric motor, producing a second rotary torque in response to the first rotary torque using a harmonic drive; rotating an output gear of a gear set using the second rotary torque; and causing a linear actuator to generate a linear motion along a compression axis using the rotation of the output gear, wherein the compression axis is different that the motor axis; and causing the piston to compress the disc stack using the linear motion of the linear actuator.

The details of one or more examples are set forth in the accompanying drawings and the description below. Other features, objects, and advantages will be apparent from the description and drawings, and from the claims.

DETAILED DESCRIPTION

Figure 1:
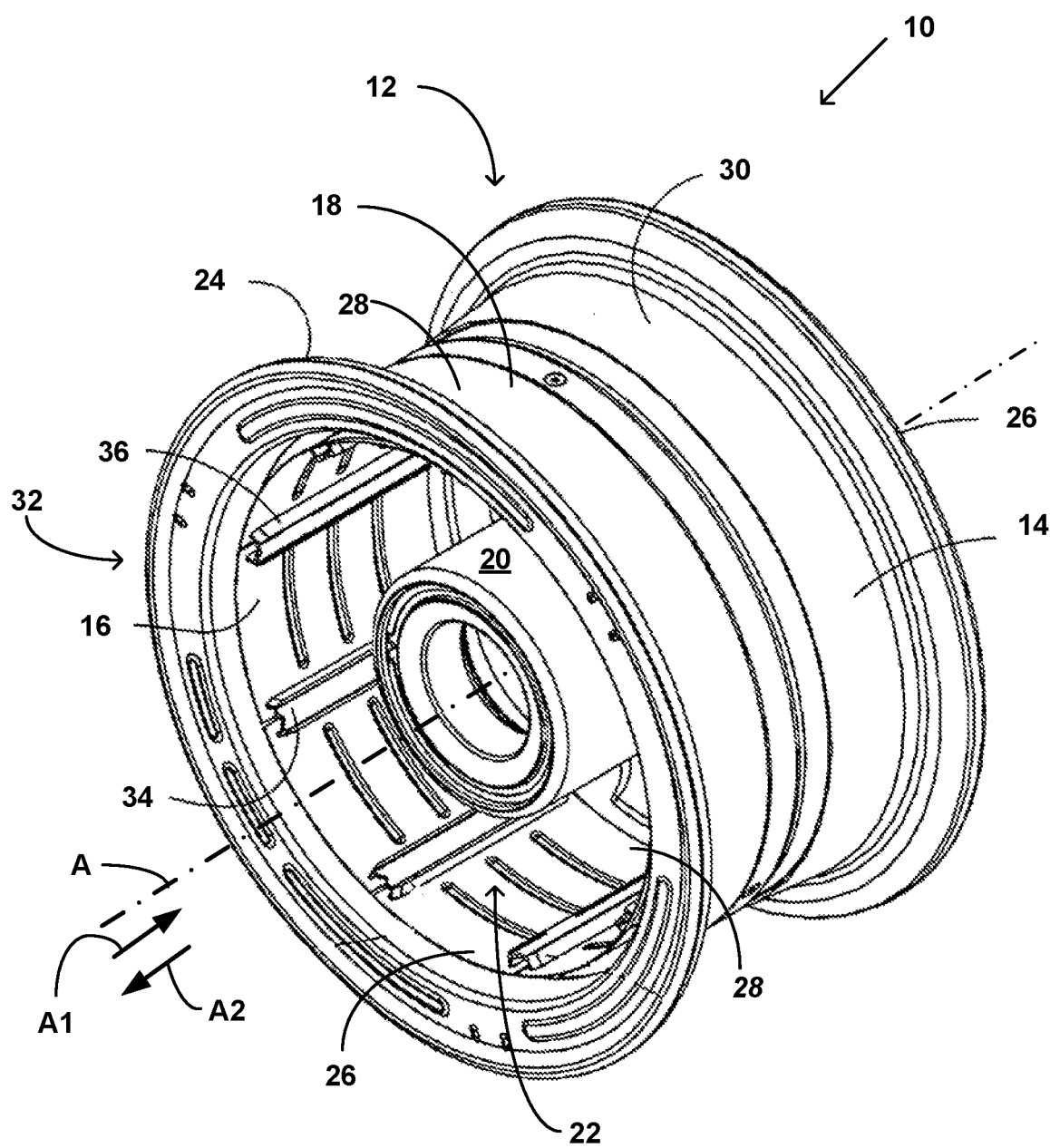
FIG. 1 is a perspective view illustrating an example wheel.

The disclosure describes articles, systems, and techniques relating to a brake assembly of a vehicle that includes a motor and a harmonic drive configured to transfer a torque generated by the motor to a brake disc stack. The brake assembly includes a disc stack which includes one or more rotor discs and one or more stator discs. For example, the disc stack may include a plurality of rotor discs interleaved with a plurality of stator discs. The rotor discs are rotationally coupled with a wheel of the vehicle, such that a rotation of the wheel around a wheel axis causes rotation of the rotor discs around the wheel axis. The stator discs are configured to remain substantially stationary relative to the wheel and the rotor discs. The brake assembly is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel.

The brake assembly includes an actuator assembly configured to cause compression of the disc stack when braking is desired, e.g., in response to user input or more automatic control. In some examples, the actuator assembly is configured to cause a translation of a piston configured to exert a compression force on the disc stack. The compression force exerted by the actuator assembly causes the rotor discs and the stator discs to slidably translate (e.g., in an axial direction of the wheel) to cause engagement between the rotating rotor discs and the stationary stator discs to generate and/or increase braking forces on the wheel. The actuator assembly is also configured to reduce and/or eliminate the compression force on the disc stack, in order to reduce an engagement between the rotating rotor discs and the stationary stator discs to reduce braking forces on the wheel. For example, the actuator assembly may be configured to exert the compression force on the disc stack to reduce and/or decrease a rotation of the wheel, and may be configured to reduce and/or eliminate the compression force to allow and/or increase a rotation of the wheel.

The brake assembly may include control circuitry configured to cause the actuator assembly to compress the disc stack based on a braking signal. For example, the control circuitry may be configured to transmit the braking signal in response to the actuation of a user input device (e.g., a foot pedal) located remotely from the brake assembly (e.g., in the cockpit of an aircraft). In examples described herein, the actuator assembly includes an motor (e.g., an electric motor) configured to generate a rotary motion in response to the braking signal and convert the rotary motion of the motor into a linear translation in order to cause the compression of the disc stack.

In examples, the motor is configured to cause the rotary motion in a first rotary direction of a motor shaft ("first shaft direction") and in a second rotary direction of the motor shaft ("second shaft direction") opposite the first shaft direction based, for example, on the braking signal. The actuator assembly is configured to convert the rotary motion in the first shaft direction into a linear translation in a first direction to, for example, increase and/or initiate a compression force exerted on the disc stack. The actuator assembly may be configured to convert the rotary motion in the second shaft direction into a linear translation in a second direction opposite the first direction to, for example, reduce and/or eliminate a compression force exerted on the disc stack. In examples, the motor defines a housing and is configured to generate the rotary motion of the motor shaft relative to the housing. The housing may be substantially stationary with respect to some portion of the brake assembly, such as a torque tube.

In examples, the actuator assembly is configured to generate a first rotary torque at a first rotational speed using the motor, generate a second rotary torque at a second rotational speed less than the first rotational speed using a harmonic drive, and convert the second rotary torque to linear motion using a linear actuator to translate a piston. The piston may be configured to cause the compression force on the disc stack. In examples, the motor is configured to generate the first rotary torque around a motor axis and the linear actuator is configured to produce the linear motion along a compression axis different from the motor axis. The harmonic drive is configured to receive the first rotary torque and provide the second rotary torque to a gear set. The gear set may be configured to receive the second rotary torque and cause an output gear to transfer at least some portion of the second rotary torque to the linear actuator, such that the linear actuator may cause the linear motion along the compression axis. The linear actuator may be configured to displace the piston substantially along the compression axis.

Hence, in some examples, the actuator assembly is configured such that the motor generates the first rotary torque around a motor axis and the linear actuator causes compression of the disc stack by displacing the piston along a compression axis different from the motor axis. The arrangement whereby the motor generates the first torque around a motor axis and the linear actuator translates the piston over a separate compression axis may allow for a more compact actuator assembly configuration as compared to in-line actuators where a single axis serves as both the motor axis and the compression axis.

The actuator assembly may be configured to substantially step-down a rotary speed generated by the motor during braking operations, in order to allow a finer control of the linear motion acting to increase or decrease the compression force on the disc stack. The finer control of the linear motion may enable increased control of the compression force applied to the disc stack, potentially improving the responsiveness and sensitivity of the braking system. In some examples, the actuator assembly steps-down the rotary speed generated by the motor using the harmonic drive. Use of the harmonic drive may reduce and/or eliminate gear backlash during alterations in motor speed that may occur in brake assemblies primarily using a meshed gearbox for speed step-down. The relatively smooth operation of the harmonic drive may allow increased braking operations-per-second compared to braking systems using a gearbox having an input gear configured to synchronously rotate with the motor for speed step-down.

In examples, the actuator assembly is configured to translate the piston when the linear actuator converts the rotary motion produced by the motor into a linear translation. For example, the actuator assembly may be configured to cause the translation of the piston in a direction substantially parallel to the axis of the wheel. The piston is configured to translate to cause the compression force (or to eliminate a previously applied compressive force) on the disc stack. In some examples, the actuator assembly includes an actuator body configured to be substantially stationary with respect to a portion of the brake assembly (e.g., a torque tube), and the actuator assembly is configured to translate the piston relative to the actuator body using the linear translation. In some examples, the actuator assembly is configured to cause the piston to translate in the first direction (e.g., to increase and/or initiate the compression force on the disc stack) when the motor generates the rotary motion in the first shaft direction, and is configured to cause the piston to translate in the second direction opposite the first direction (e.g., to reduce and/or eliminate the compression force on the disc stack) when the motor generates the rotary motion in the second shaft direction.

The harmonic drive of the actuator assembly is configured to receive the first rotary torque in the first rotational direction and the first rotational speed from the motor and produce a second rotary torque using the first rotary torque. The harmonic drive is configured to produce the second rotary torque in a second rotational direction opposite the first rotational direction, and at a second rotational speed less than the first rotational speed. In some examples, the harmonic drive includes a harmonic wave generator configured to receive the first rotary torque from the motor (e.g., the motor shaft) and rotate relative to the motor housing in the same rotational direction as the motor shaft rotates relative to the motor housing. For example, the harmonic drive may include a flexible spline configured such that, as the harmonic wave generator rotates in the first rotational direction (e.g., under the influence of the first rotary torque), the flexible spline produces the second rotary torque in the second rotational direction. Hence, the direction of rotation of the motor shaft (e.g., in the first shaft direction or the second shaft direction) may determine the first rotational direction of the first rotary torque, and may thereby determine the second rotational direction of the second rotary torque.

The motor may impart the first rotary torque in the first rotational direction to the harmonic drive by at least causing the motor shaft to rotate in either the first shaft direction or the second shaft direction. Thus, as used herein, the first rotational direction refers to a rotational direction of the first rotary torque imparted to the harmonic drive by the motor, rather than a direction of shaft rotation employed by the motor to impart the first rotary torque. The second rotational direction refers to a rotational direction of the second rotary torque produced by the harmonic drive using the first rotary torque, rather than a direction of shaft rotation employed by the motor when the harmonic drive generates the second rotary torque.

Similarly, the flexible spline of the harmonic drive may rotate in a first spline direction or a second spline direction opposite the first spline direction to produce a second rotary torque in the second rotary direction opposite the first rotary direction. In some examples, the motor shaft and the flexible spline rotate around a common axis (e.g., a motor axis), and the motor shaft and flexible spline are configured to rotate around the common axis in opposite rotational directions.

The harmonic drive, which may be referred to as a harmonic reducer in some examples, has any suitable configuration. In some examples, the harmonic drive includes a fixed spline configured to remain substantially stationary with respect to the motor housing, and a flexible spline. The flexible spline defines external gear teeth configured to mesh with internal gear teeth defined by the fixed spline to generate the second rotary torque in the second rotational direction and the second speed. In some examples, the fixed spline defines a substantially circular (e.g., circular or nearly circular to the extent permitted by manufacturing tolerances) pitch circle and the harmonic wave generator is configured to cause the flexible spline to define a substantially elliptical pitch circle. In some of these examples, the harmonic drive is configured to cause the external teeth of the flexible spline to mesh with the internal teeth of the circular spline at points substantially along a major axis of the substantially elliptical pitch circle to generate the second rotary torque. The harmonic drive is configured to cause a speed reduction from the first rotary torque to the second rotary torque based on a reduction ratio dependent on the tooth number (e.g., the number of teeth) of the flexible spline and the tooth number of the fixed spline. In examples, the tooth number of the fixed spline is greater than the tooth number of the flexible spline.

The harmonic drive (e.g., the flexible spline of the harmonic drive) may be configured to impart the second rotary torque to an input gear of a gear set to cause a rotation of the input gear. For example, the harmonic drive can be configured to cause a rotation of the input gear based on the second rotational direction of the second rotary torque. In some examples, the gear set includes an output gear, and the input gear is configured to cause a rotation of the output gear when the harmonic drive causes the rotation of the input gear. The gear set may be configured such that a direction of rotation of the input gear (e.g., by the harmonic drive) substantially determines a direction of rotation of the output gear ("output gear direction"). Hence, the actuator assembly may be configured such that when the motor shaft imparts the first rotary torque in the first rotational direction to the harmonic drive, and the harmonic drive uses the first rotary torque to impart the second rotary torque in the second rotational direction to the input gear, the output gear direction is determined by the direction of rotation of the motor shaft.

In some examples, the actuator assembly is configured such that rotation of the motor shaft in the first shaft direction causes the output gear to rotate in a first output gear direction, and such that rotation of the motor shaft in the second shaft direction causes the output gear to rotate in a second output gear direction opposite the first output gear direction.

In some examples, the linear actuator is configured to produce the linear motion using the rotation of the output gear directly or indirectly. For example, the actuator assembly can be configured such that rotation of the output gear in the first output gear direction causes the linear actuator to generate the linear motion in the first direction, and rotation of the output gear in the second output gear direction causes the linear actuator to generate the linear motion in the second direction. Hence, the actuator assembly may be configured such that when the motor shaft rotates in the first shaft direction to cause the output gear to rotate in the first output gear direction, the linear actuator displaces the piston in the first direction to increase and/or initiate the compression force on the disc stack and when the motor shaft rotates in the second shaft direction to cause the output gear to rotate in the second output gear direction, the linear actuator displaces the piston in the second direction to reduce and/or eliminate the compression force on the disc stack.

In some examples, the linear actuator includes a driver configured to cause a screw to linearly translate when the driver rotates relative to the screw. The output gear may be configured to cause the rotation of the driver when the motor (e.g., via the harmonic drive) causes the rotation of the output gear. The linear actuator may be configured such that a direction of rotation of the driver around the screw determines a direction of the linear translation of the screw (e.g., the first direction or the second direction). Hence, the linear actuator may be configured to generate the linear motion based on a direction of the rotary motion received from the gear set. In some examples, the driver is a ball nut and a screw is a ball screw. The linear actuator may be configured to cause a plurality of ball bearings between the ball nut and the ball screw to transmit a force to the ball screw when the ball nut rotates relative to the ball screw.

Hence, the brake assemblies described herein are configured to exert a compression force on a disc stack using an actuator assembly to control braking forces applied to a wheel. The actuator assembly is configured to generate a first rotary torque (e.g., around a motor axis defined by the motor) at a first rotational speed using a motor and generate a second rotary torque at a second rotational speed using a harmonic drive. The actuator assembly may be configured to use the second rotary torque to translate a piston along a compression axis different than the motor axis. The arrangement whereby the motor generates the first torque around a motor axis and the linear actuator translates the piston over a separate compression axis may allow for a more compact actuator assembly as compared to in-line actuators where a single axis serves as both the motor axis and the compression axis. The use of the harmonic drive may reduce and/or eliminate gear backlash during alterations in motor speed and may allow increased braking operations-per-second compared to braking systems that primarily use a meshed gearbox for speed step-down.

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 20. In some examples, interior surface 16 may include an inner diameter of tubewell 18 of wheel 10. For example, in some cases, interior surface 16 may be referred to as an inner diameter surface of wheel 10. Interior surface 16 and wheel hub 20 may define a wheel cavity 22 (e.g., a volume) between interior surface 16 and wheel hub 20. In some examples, a tire (not shown) may be mounted on exterior surface 14 of rim 12. Wheel 10 may include an inboard bead seat 24 and an outboard bead seat 26 configured to retain a tire on exterior surface 14 of rim 12. In examples, wheel 10 may comprise an inboard section 28 (e.g., including inboard bead seat 24) and an outboard section 30 (e.g., including outboard bead seat 26). Wheel 10 is configured to rotate around the axis of rotation A. An axial direction A1 of wheel 10 is parallel to the axis of rotation A. An axial direction A2 of wheel 10 is parallel to the axis of rotation A and opposite the direction A1.

Wheel 10 includes a plurality of rotor drive keys 32 on interior surface 16 of wheel 10, such as rotor drive key 34 and rotor drive key 36. In some examples, each rotor drive key of the plurality of rotor drive keys 32 extends in the axial direction A1 of wheel 10 (e.g., in a direction parallel to the axis of rotation A). The plurality of rotor drive keys 32 ("rotor drive keys 32") and interior surface 16 are configured to be substantially stationary with respect to each other, such that when wheel 10 (and interior surface 16) rotates around axis of rotation A, each of the rotor drive keys (e.g., rotor drive keys 34, 36) translates over a closed path around axis A. Consequently, when wheel 10, interior surface 16, and rotor drive keys 32 are rotating around axis of rotation A, a force on one or more of rotor drive keys 32 opposing the direction of rotation acts to slow or cease the rotation. Rotor drive keys 32 may be configured to receive a torque from a brake assembly (e.g., brake assembly 40 shown in FIG. 2 or other brake assemblies) configured to reduce and/or cease a rotation of wheel 10. Rotor drive keys 32 may be integrally formed with interior surface 16, or may be separate from and mechanically affixed to interior surface 16.

Figure 2:
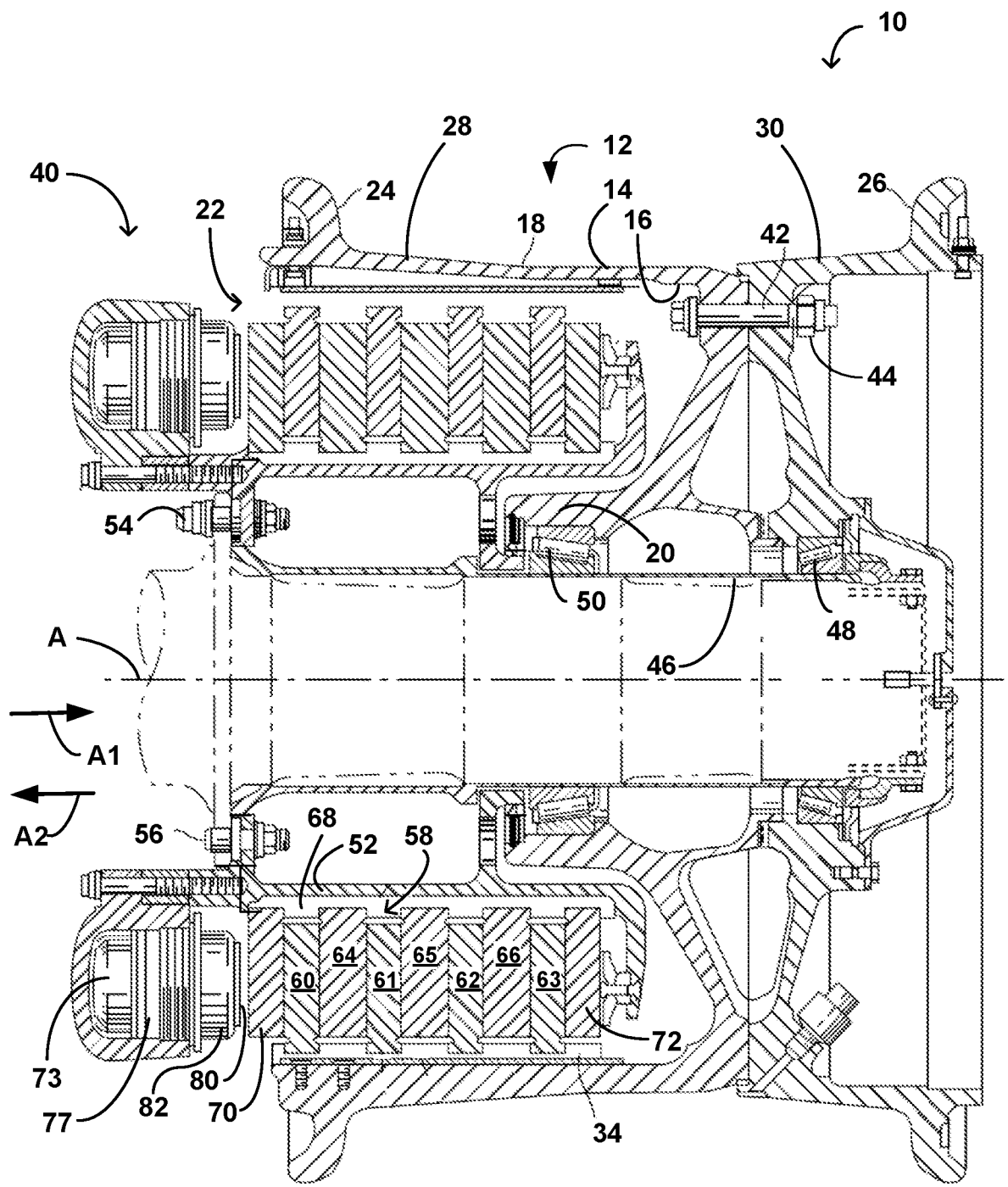
FIG. 2 is a schematic cross-sectional view of an example wheel and brake assembly including the wheel of FIG. 1.

FIG. 2 is a schematic cross-sectional view illustrating wheel 10 and an example brake assembly 40. Wheel 10 includes wheel rim 12, exterior surface 14, interior surface 16, wheel cavity 22, wheel hub 20, inboard bead seat 24, outboard bead seat 26, inboard section 28, outboard section 30, and rotor drive key 34. FIG. 2 illustrates wheel rim 12 as a split rim wheel with lug bolt 42 and lug nut 44 connecting inboard section 28 and outboard section 30, however wheel rim 12 may utilize other configurations (e.g., a unified wheel rim) in other examples. Wheel 10 and brake assembly 40 is shown and described to provide context to the example drive inserts described here. The drive inserts described herein, however, may be used with any suitable wheel and brake assembly in other examples.

Wheel 10 is configured to rotate about wheel axis A extending through axial assembly 46. Axial assembly 46 is figured to support wheel 10 while allowing wheel 10 to rotate around wheel axis A using bearing 48 and bearing 50. For example, bearings 48, 50 may define a substantially circular track around axial assembly 46. A torque tube 52 is coupled to axial assembly 46 (e.g., via bolts 54, 56), such that torque tube 52 remains substantially stationary when wheel 10 rotates around axial assembly 46 and wheel axis A. Torque tube 52 may at least partially surround an exterior of axial assembly 46. Axial assembly 46 may be mechanically coupled to a structure (e.g., a strut) attached to a vehicle.

In the example shown in FIG. 2, the portion of brake assembly 40 depicted is shown as being positioned within wheel 10 and is configured to engage torque tube 52 and rotor drive key 34. Brake assembly 40 is configured to generate a torque to oppose a rotation of wheel 10 around wheel axis A and transfer the torque to rotor drive key 34, reducing and/or eliminating the rotation of wheel 10 around wheel axis A. Brake assembly 40 includes a disc stack 58 which includes one or more rotor discs (e.g., rotor discs 60, 61, 62, 63) and one or more stator discs (e.g., stator discs 64, 65, 66). Rotor discs 60, 61, 62, 63, and/or stator discs 64, 65, 66, may have any suitable configuration. For example, rotor discs 60, 61, 62, 63 and/or stator discs 64, 65, 66 can each be substantially annular discs surrounding axial assembly 46. Stator discs 64, 65, 66 are coupled to torque tube 52 via spline 68 and remain rotationally stationary with respect to torque tube 52 (and axial assembly 46) as wheel 10 rotates. Rotor discs 60, 61, 62, 63 are rotationally coupled to rotor drive key 34 and interior surface 16 and rotate substantially synchronously with wheel 10 around axis A. For example, rotor drive key 34 may be configured to extend through a drive slot on a perimeter of one or more of rotor discs 60, 61, 62, 63 to cause rotor discs 60, 61, 62, 63 to rotate substantially synchronously with wheel 10. Disc stack 58 may include any number of rotor discs and stator discs.

Rotor discs 60, 61, 62, 63, and/or stator discs 64, 65, 66, may be configured to provide opposing friction surfaces for braking a vehicle, such as an aircraft. Compression of disc stack 58 (e.g., between pressure plate 70 and backing plate 72) may bring the opposing friction surfaces into contact, generating shearing forces between the rotor discs rotating substantially synchronously with wheel 10 and the stator discs remaining substantially stationary with respect to torque tube 52. The shearing forces may cause a rotor disc (e.g., rotor discs 60, 61, 62, 63) engaged with rotor drive key 34 to impart a torque on rotor drive key 34 opposing the rotation of wheel 10. The rotor disc may impart the opposing torque to rotor drive key 34 using the drive slot through which rotor drive key 34 extends.

An actuator assembly 73 including actuator body 77 is configured to cause a piston 82 to translate relative to actuator body 77 to cause the compression of disc stack 58. Actuator assembly 73 may be configured to cause piston 82 to translate in the direction A1 and in the direction A2. For example, actuator assembly 73 can be configured to cause piston 82 to compress disc stack 58 when piston 82 translates substantially in the direction A1, and configured to cause piston 82 to relieve (e.g., reduce and/or eliminate) the compression when piston 82 translate in the direction substantially in the direction A2. Brake assembly 40 may be configured such that the compression of disc stack 58 (e.g., by translating piston 82 substantially in the direction A1) causes engagement between the friction surfaces of rotor discs 60, 61, 62, 63 and stator discs 64, 65, 66, generating braking forces to reduce and/or substantially prevent a rotation of wheel 10. Brake assembly 40 may be configured such that reducing and/or eliminating the compression of disc stack 58 (e.g., by translating piston 82 substantially in the direction A2) reduces and/or eliminates the engagement of rotor discs 60, 61, 62, 63 and stator discs 64, 65, 66, reducing and/or eliminating the braking forces on wheel 10.

In the example shown in FIG. 2, piston 82 defines a piston face 80 configured to establish a contract pressure on pressure plate 70 when actuator assembly 73 translates piston 82 in the direction A1. Actuator assembly 73 is configured to increase the contact pressure by causing piston 82 to translate in the direction A1, in order to increase the braking force on wheel 10 generated by the friction surfaces of rotor discs 60, 61, 62, 63 and stator discs 64, 65, 66. Actuator assembly 73 is configured to decrease the contact pressure by causing piston 82 to translate in the direction A2, in order to decrease the braking force on wheel 10 generated by the friction surfaces of rotor discs 60, 61, 62, 63 and stator discs 64, 65, 66.

In examples, actuator assembly 73 is configured to cause piston 82 to translate using motion (e.g., a rotary motion) generated by an electric motor. Actuator assembly 73 may be configured to convert the rotary motion of the electric motor to linear motion to cause the translation of piston 82 in the direction A1 and/or the direction A2. In some examples, actuator assembly 73 is configured to generate a first rotary torque at a first speed using the electric motor and convert the first rotary torque to a second rotary torque at a second speed less than the first speed. Actuator assembly 73 may be configured to rotate some portion of a linear actuator using the second rotary torque in order to cause the translation of piston 82 in the direction A1 and the direction A2.

In examples, actuator assembly 73 also includes a harmonic reducer configured to receive the first rotary torque at the first speed and generate the second rotary torque at the second speed. In some examples, actuator assembly 73 further includes a gear set configured such that the electric motor generates the first rotary torque around a motor axis and piston 82 compresses disc stack 58 along a compression axis, where the motor axis is different (e.g., displaced from) the compression axis.

Wheel 10 and brake assembly 40 may be used with any variety of private, commercial, or military aircraft or other type of vehicle. Wheel 10 may be mounted to a vehicle via, for example, axial assembly 46, or some other appropriate arrangement to allow wheel 10 to rotate around wheel axis A. Axial assembly 46 may be mounted on a strut of a landing gear (not shown) or other suitable component of a vehicle to connect wheel 10 to the vehicle. Wheel 10 may rotate around wheel axis A and axial assembly 46 to impart motion to the vehicle. Wheel 10 is shown and described to provide context to the brake assembly described herein, however the brake assembly described herein may be used with any suitable wheel assembly in other examples.

Figure 3:
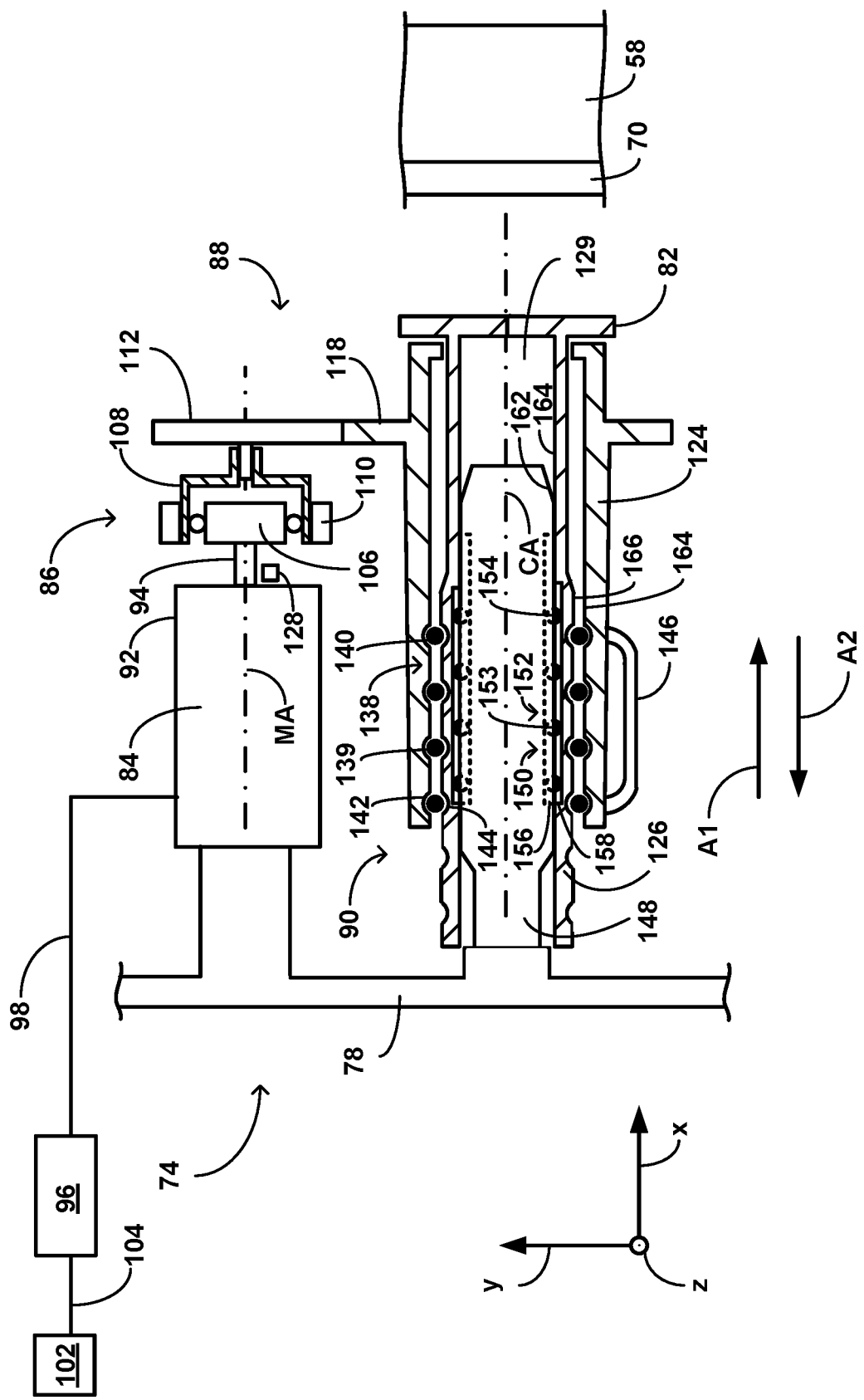
FIG. 3 is a schematic view illustrating an example actuator.
Figure 4:
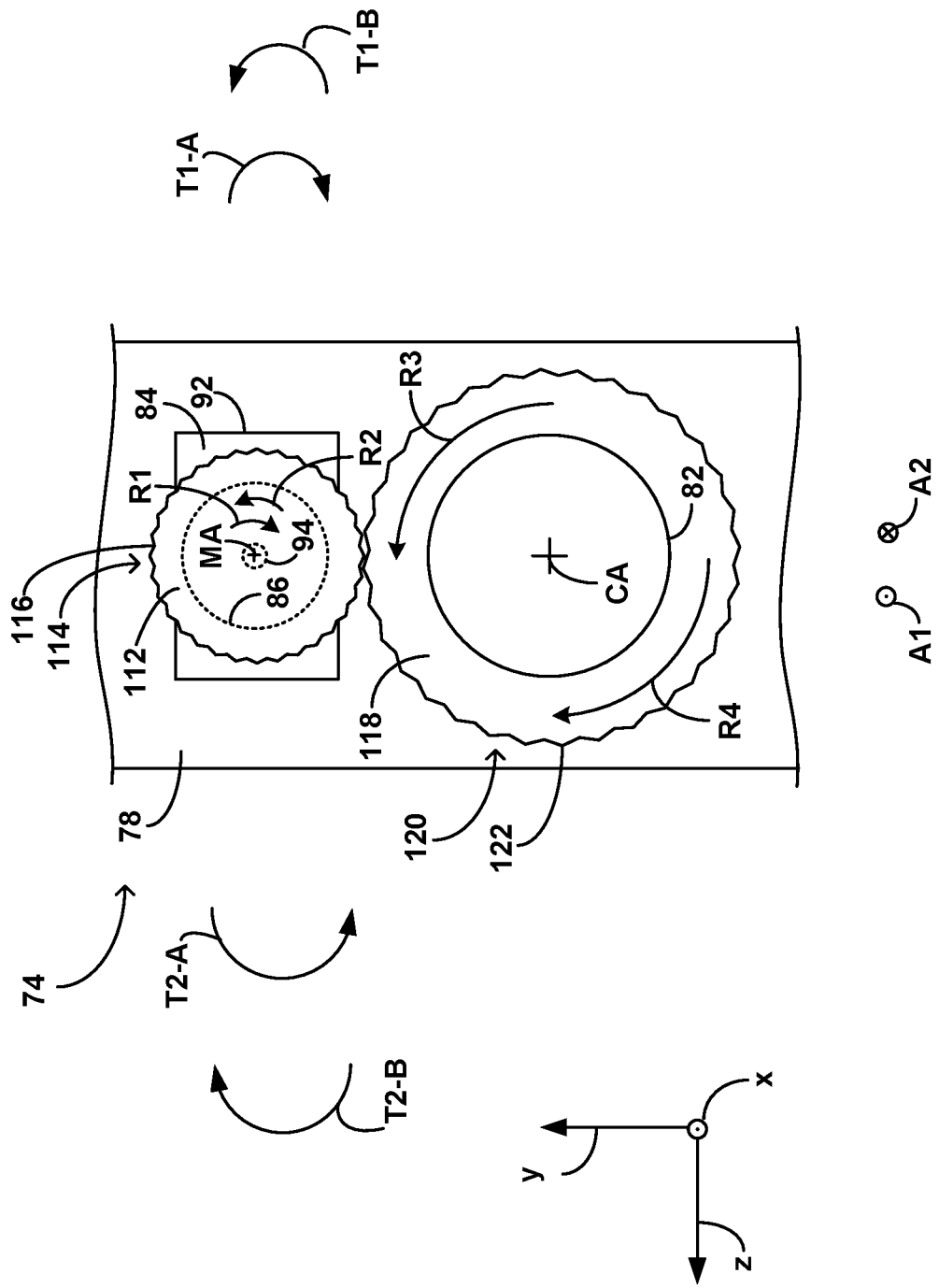
FIG. 4 is a schematic view illustrating another view of the example actuator of FIG. 3.

FIG. 3 is a conceptual illustration of an example actuator assembly 74 and illustrates part of actuator assembly 74 in cross-section and parts as functional block diagram, with reference to the x-y-z axes shown. Actuator assembly 74 includes actuator body 78. Actuator assembly 74 is an example of actuator assembly 73 and actuator body 78 is an example of actuator body 77 (FIG. 2). FIG. 4 illustrates another view of actuator assembly 74 and includes the x-y-z axes of FIG. 3 for reference. Actuator assembly 74 includes motor 84, harmonic drive 86, gear set 88, and linear actuator 90. Portions of harmonic drive 86 are shown in dashed lines in FIG. 4. Axial direction A1 and A2 are illustrated in FIGS. 3 and 4, with axial direction A1 proceeding out of the page and axial direction A2 proceeding into the page in FIG. 4.

Actuator assembly 74 is configured to cause compression of disc stack 58 using piston 82 when braking is desired. Actuator assembly 74 is configured to translate piston 82 in a first direction (e.g., in the axial direction A1) to cause a compression force on disc stack 58 (e.g., via pressure plate 70) to generate and/or increase braking forces on wheel 10 (FIG. 1). Actuator assembly 74 is configured to translate piston 82 in a second direction substantially opposite the first direction (e.g., the axial direction A2) to reduce and/or eliminate the compression force on disc stack 58, in order to reduce and/or substantially eliminate braking forces on wheel 10. In the example shown in FIGS. 3 and 4, actuator body 78 is configured to be substantially stationary with respect to a portion of brake assembly 40 (e.g., torque tube 52, or some other portion). In some examples, actuator assembly 74 is configured to translate piston 82 relative to actuator body 78.

Actuator assembly 74 is configured to convert a rotary motion produced by motor 84 into a linear translation of piston 82 to control the braking forces on wheel 10 generated by brake assembly 40 (FIG. 2). In the example shown in FIGS. 3 and 4, motor 84 includes a motor housing 92 and a motor shaft 94, and motor 84 is configured to generate the rotary motion by at least causing a rotation of motor shaft 94 relative to motor housing 92. Motor housing 92 may be configured to be substantially stationary with respect to actuator body 78. Motor 84 may be configured cause the rotation of motor shaft 94 around a motor axis MA defined by motor shaft 94. In examples, motor 84 is configured to cause a rotation of motor shaft 94 in a first shaft direction R1 (e.g., clockwise around motor axis MA) and in a second shaft direction R2 substantially opposite the first shaft direction R1 (e.g., counter-clockwise around motor axis MA). Motor housing 92 may be configured to be substantially stationary with respect to actuator body 78. Further, the first shaft direction R1 and second shaft direction R2 are illustrated as examples only. In other examples, the first shaft direction R1 may be counter-clockwise and the second shaft direction R2 clockwise around motor axis MA, or first shaft direction R1 and first shaft direction R2 may have some other arrangement with respect to actuator assembly 74.

In some examples, actuator assembly 74 is configured such that a rotary motion of motor shaft 94 in the first shaft direction R1 causes piston 82 to increase and/or initiate a compression force on disc stack 58, increasing the braking forces transmitted from brake assembly 40 to wheel 10 (e.g., via rotor drive keys 32, 34, 36 (FIGS. 1 and 2)). In addition, actuator assembly 74 may be configured such that a rotary motion of motor shaft 94 in the second shaft direction R2 causes piston 82 to decrease and/or substantially eliminate a compression force on disc stack 58, decreasing the braking forces transmitted from brake assembly 40 to wheel 10. In examples, actuator assembly 74 is configured to convert a rotary motion of motor shaft 94 in the first shaft direction R1 into a linear translation of piston 82 in the first direction (e.g., the axial direction A1), and to convert a rotary motion of motor shaft 94 in the second shaft direction R2 into a linear translation of piston 82 in the second direction (e.g., the axial direction A2).

Control circuitry 96 is configured to control actuator assembly 74. For example, control circuitry 96 may be configured to transmit a braking signal to actuator assembly 74 to cause actuator assembly 74 to translate piston 82. In examples, control circuitry 96 is configured to transmit the braking signal using communication link 98. Motor 84 may be configured to generate rotary motion in response to the braking signal. In some examples, control circuitry 96 is configured to receive a user input from an input device 102 (e.g., a foot pedal in a cockpit and/or an Anti-lock Braking System (ABS)) and transmit the braking signal to actuator assembly 74 based on the user input. Input device 102 may transmit the braking signal to control circuitry 96 using communication link 104. In examples, control circuitry 96 is configured receive a first user input (e.g., indicative of a desire for increased braking) and transmit the braking signal to actuator assembly 74 causing motor 84 to generate a rotary motion in the first shaft direction R1, and is further configured receive a second user input (e.g., indicative of a desire for reduced braking) and transmit the braking signal to actuator assembly 74 causing motor 84 to generate a rotary motion in the second shaft direction R2.

Actuator assembly 74 is configured to produce a first rotary torque at a first rotational speed using motor 84. In examples, actuator assembly 74 produces the first rotary torque using the rotation of motor shaft 94. Actuator assembly 74 may produce the first rotary torque in a first rotational direction. In examples, the first rotational direction of the first rotary torque is determined by a direction of rotation of motor shaft 94. Motor shaft 94 may generate the first rotary torque having the first rotational direction when motor shaft 94 rotates in either the first shaft direction R1 or the second shaft direction R2. Hence, in some examples, the first rotary direction of the first rotary torque has the same rotational direction as the first shaft direction R1 (as illustrated by T1-A (FIG. 4), and in other examples, the first rotary direction of the first rotary torque has the same rotational direction as the second shaft direction R2 (as illustrated by T1-B (FIG. 4)). In some examples, actuator assembly 74 is configured such that the first rotary torque acts around motor axis MA. In addition or instead, in some examples, actuator assembly 74 is configured such that the first rotary torque acts around motor shaft 94.

Actuator assembly 74 is configured to step-down the first rotational speed by at least using the first rotary torque to produce a second rotary torque having a second rotational speed less than the first rotational speed. In examples, the first rotational speed is dependent on or substantially equal to a rotational speed of motor shaft 94. Stepping down the first rotational speed may allow motor 84 to be a relatively high-speed motor configured to generate rotation at higher shaft speeds that may be desired for other components (e.g., gear set 88 and/or linear actuator 90) of actuator assembly 74. Further, the first rotary torque produced by motor 84 may be lower than what might be desired for operation of actuator assembly 74. Stepping down the first rotational speed to the second rotational speed may cause the second rotary torque produced to exceed the first rotary torque, such that the remainder of actuator assembly 74 (e.g., gear set 88 and/or linear actuator 90) may be acted on by a torque exceeding that produced by motor 84. Thus, in examples, actuator assembly 74 is configured to use the first rotary torque at the first rotational speed produced by motor 84 to produce a second rotary torque at a second rotational speed, wherein the second rotary torque is greater than the first rotary torque and the second rotational speed is less than the first rotational speed.

Harmonic drive 86 is configured to receive the first rotary torque (e.g., T1-A or T1-B) from motor 84 and produce the second rotary torque at the second rotational speed in response to the first rotary torque. The second rotary speed is less than the first rotary speed in some examples. The second rotary torque is greater than the first rotary torque in some examples. In some examples, the first rotary torque has a first rotational direction, and harmonic drive 86 is configured to produce the second rotary torque in a second rotational direction opposite the first rotational direction. For example, harmonic drive 86 may be configured to receive the first rotary torque T1-A (FIG. 4) having the first rotational direction clockwise around motor axis MA (or some other axis) and generate a second rotary torque T2-A having the second rotational direction counter-clockwise around motor axis MA (or the other axis). Harmonic drive 86 may be configured to receive the first rotary torque T1-B having the first rotational direction counter-clockwise around motor axis MA (or some other axis) and generate a second rotary torque T2-B having the second rotational direction clockwise around motor axis MA (or the other axis).

Hence, harmonic drive 86 is configured to produce the second rotary torque having the second rotational direction opposite the first rotational direction when motor shaft 94 rotates in either the first shaft direction R1 or the second shaft direction R2. In examples, when motor shaft 94 rotates in the first shaft direction R1 around motor axis MA, the first rotational direction of the first rotary torque (e.g., T1-A) is substantially the same as the first shaft direction R1, and the second rotational direction of the second rotary torque (e.g., T2-A) is substantially the same as the second shaft direction R2. In examples, when motor shaft 94 rotates in the second shaft direction R2 around motor axis MA, the first rotational direction of the first rotary torque (e.g., T1-B) is substantially the same as the second shaft direction R2 and the second rotational direction of the second rotary torque (e.g., T2-B) is substantially the same as the first shaft direction R1.

Harmonic drive 86 has any suitable configuration. In some examples, as shown in FIG. 3, harmonic drive 86 includes a harmonic wave generator 106, a flexible spline 108, and a fixed spline 110 (FIG. 3). Harmonic wave generator 106 is configured to rotate around an axis (e.g., motor axis MA) when harmonic wave generator 106 receives the first rotary torque from motor 84. Fixed spline 110 is configured to be substantially stationary with respect to actuator body 78 and/or motor housing 92. Flexible spline 108 engages both harmonic wave generator 106 and fixed spline 110. In examples, flexible spline 108 is positioned between harmonic wave generator 106 and fixed spline 110. Harmonic drive 86 is configured to cause flexible spline 108 to produce the second rotary torque in the second rotational direction when harmonic wave generator 106 receives the first rotary torque in the first rotational direction (e.g., from motor 84).

Actuator assembly 74 may be configured to cause gear set 88 to rotate in response to the second rotary torque. For example, harmonic drive 86 (e.g., flexible spline 108) can be configured to impart the second rotary torque to gear set 88 to cause the rotation. Gear set 88 may include one or more gears (e.g., input gear 112 and output gear 118) configured to transfer the rotary motion to linear actuator 90, to cause linear actuator 90 to translate piston 82 in the axial direction A1 (e.g., to increase and/or initiate a compression force on disc stack 58) or the axial direction A2 (e.g., to reduce and/or substantially eliminate the compression force on disc stack 58).

Gear set 88 is configured such that a direction of rotation of the rotary motion transferred to linear actuator 90 is dependent on the second rotational direction of the second rotary torque imparted by harmonic drive 86. Linear actuator 90 may be configured such that the direction of rotation of the rotary motion transferred from gear set 88 substantially determines the linear direction (e.g., axial direction A1 or axial direction A2) which linear actuator 90 translates piston 82. Hence, actuator assembly 74 may be configured such that the direction of linear translation generated by linear actuator 90 is dependent on the direction of rotation of motor shaft 94. For example, when motor shaft 94 rotates in one direction (e.g., the first shaft direction R1 or second shaft direction R2), actuator assembly 74 may be configured such that linear actuator 90 translates piston 82 to increase and/or initiate the compression force on disc stack 58; and when motor shaft 94 rotates in another direction (e.g., the other of first shaft direction R1 or second shaft direction R2), actuator assembly 74 may be configured such that linear actuator 90 translates piston 82 to decrease and/or substantially eliminate the compression force on disc stack 58.

In some examples, harmonic drive 86 (e.g., flexible spline 108) is configured to impart the second rotary torque to an input gear 112 of gear set 88 to cause a rotation of input gear 112. In examples, actuator assembly 74 is configured to cause a rotation of input gear 112 based on the second rotational direction of the second rotary torque. For example, when harmonic drive 86 produces the second rotary torque T2-A, actuator assembly 74 may be configured to cause a rotation of input gear 112 in substantially the same direction as the second rotary torque T2-A. When harmonic drive 86 produces the second rotary torque T2-B, actuator assembly 74 may be configured to cause a rotation of input gear 112 in substantially the same direction as the second rotary torque T2-B. In some examples, actuator assembly 74 is configured to cause a rotation of input gear 112 in a direction opposite the rotation of motor shaft 94.

In some examples, input gear 112 defines gear teeth 114 ("input gear teeth 114") around an outer perimeter 116 of input gear 112. For example, input gear 112 may define input gear teeth 114 around a pitch circle surrounding a gear axis of input gear 112. In some examples, input gear 112 is configured such that input gear teeth 114 substantially rotate around motor axis MA when the second rotary torque is imparted to input gear 112. For example, the gear axis of input gear 112 may be substantially parallel to or substantially coincident with motor axis MA defined by motor 84.

Gear set 88 further includes an output gear 118. Gear set 88 is configured such that the rotation of input gear 112 causes a corresponding rotation of output gear 118. In examples, gear set 88 is configured such that a direction of rotation of input gear 112 substantially determines the output gear direction of output gear 118. Hence, when motor shaft 94 imparts the first rotary torque (e.g., T1-A or T1-B) in the first rotational direction to harmonic drive 86, and harmonic drive 86 uses the first rotary torque to impart the second rotary torque (e.g., T2-A or T2-B) in the second rotational direction to input gear 112, actuator assembly 74 may be configured such that the output gear direction of output gear 118 is dependent on the direction of rotation of motor shaft 94. In examples, actuator assembly 74 is configured such that rotation of motor shaft 94 in first shaft direction R1 causes output gear 118 to rotate in a first output gear direction (e.g., output gear direction R3 (FIG. 4)), and rotation of motor shaft 94 in second shaft direction R2 causes output gear 118 to rotate in a second output gear direction opposite the first output gear direction (e.g., output gear direction R4 (FIG. 4)). Output gear 118 may be configured to transfer rotary motion to linear actuator 90 in either the first output gear direction or the second output gear direction.

In some examples, output gear 118 defines gear teeth 120 ("output gear teeth 120") around an outer perimeter 122 of output gear 118, e.g., around a pitch circle surrounding a gear axis of output gear 118. In examples, and as depicted at FIG. 3 and FIG. 4, output gear teeth 120 are configured to mesh with input gear teeth 114, such that input gear teeth 114 exert a torque on output gear teeth 120 causing the rotation of output gear 118 around the axis of output gear 118. In examples, actuator assembly 74 is configured such that the gear axis of output gear 118 is displaced from the gear axis of input gear 112. In examples, actuator assembly 74 is configured such that the gear axis of output gear 118 is substantially parallel to the gear axis of input gear 112. Actuator assembly 74 may be configured such that the gear axis of output gear 118 is substantially parallel (e.g., parallel or nearly parallel to the extent permitted by manufacturing tolerances) to motor axis MA defined by motor 84.

Linear actuator 90 is configured to cause piston 82 to linearly translate substantially along a compression axis CA. As shown in FIG. 3, in some examples, compression axis CA is displaced from motor axis MA, e.g., in the y-axis direction as shown or one or more other or additional axes. In examples, as shown in FIG. 3, gear set 88 is configured to convert a rotary motion around motor axis MA (e.g., from flexible spline 108) to a rotary motion around compression axis CA. In examples, actuator assembly 74 is configured such that input gear 112 rotates around motor axis MA and output gear 118 rotates around compression axis CA. In some examples, actuator assembly 74 is configured such that motor 84 and/or harmonic drive 86 is displaced from compression axis CA in one or more of the x-y-z axes (e.g., the y-axis as shown in FIG. 3). Actuator assembly 74 may be configured such that linear actuator 90 is displaced from motor axis MA in one or more of the x-y-z axes (e.g., the y-axis as shown in FIG. 3). Thus, actuator assembly 74 allows flexibility in the relative positioning of motor 84, harmonic drive 86, and/or linear actuator 90 as compared to in-line actuators which may be configured to rotate a motor shaft around a motor axis and cause a piston to translate over a compression axis substantially coincident with the motor axis.

Linear actuator 90 is configured to receive the rotary motion from gear set 88 and convert the rotary motion into a linear translation substantially along compression axis CA. In examples, linear actuator 90 includes a driver 124 configured to receive the rotary motion from gear set 88. Driver 124 may be configured to rotate (e.g., around compression axis CA) when driver 124 receives the rotary motion from gear set 88. Linear actuator 90 may be configured to produce the linear translation substantially along compression axis CA when driver 124 rotates. In examples, output gear 118 is configured to transfer the rotary motion to driver 124. Driver 124 may be configured to rotate in a first direction ("first driver direction") when output gear 118 transfers rotary motion to driver 124 in the first output gear direction, and configured to rotate in a second direction ("second driver direction") opposite the first driver direction when output gear 118 transfers rotary motion to driver 124 in the second output gear direction.

In some examples, output gear 118 and driver 124 form a substantially rigid body (e.g., form a substantially unitary component), such that driver 124 and output gear 118 rotate in the same rotational direction. For example, actuator assembly 74 may be configured such that, when output gear 118 rotates in the direction R3 around compression axis CA, driver 124 rotates in the direction R3 around compression axis CA. Actuator assembly 74 may be configured such that, when output gear 118 rotates in the direction R4 around compression axis CA, driver 124 rotates in the direction R4 around compression axis CA.

Actuator assembly 74 has any suitable configuration that is configured to cause piston 82 to translate in the axial direction A1 or A2. In some examples, actuator assembly 74 includes a screw 126 configured to linearly translate along compression axis CA when driver 124 rotates, where screw 126 is configured to cause piston 82 to translate in the axial direction A1 or the axial direction A2 when screw 126 linearly translates. In examples, screw 126 is configured to linearly translate in the first axial direction A1 when driver 124 rotates in the first driver direction (e.g., the direction R3). Screw 126 may be configured to linearly translate in the second axial direction A2 when driver 124 rotates in the second driver direction (e.g., the direction R4).

Screw 126 may be configured to cause piston 82 to increase and/or initiate a compression force on disc stack 58 when screw 126 linearly displaces piston 82 in the axial direction A1. Screw 126 may be configured to cause piston 82 to decrease and/or eliminate the compression force on disc stack 58 when screw 126 linearly displaces piston 82 in the axial direction A2. The direction of linear translation of screw 126 is dependent on the driver direction of driver 124 and output gear direction of output gear 118, which is dependent on the second rotational direction of the second rotary torque (T2-A or T2-B) determined by motor shaft 94. Thus, the direction of linear translation produced by screw 126 may be dependent on the direction of rotation of motor shaft 94.

Hence, actuator assembly 74 is configured to generate a first rotary torque (T1-A or T2-B) at a first rotational speed using motor 84, generate a second rotary torque (T2-A or T2-B) at a second rotational speed less than the first rotational speed using harmonic drive 86, and convert the second rotary torque to linear motion using linear actuator 90. Linear actuator 90 may translate piston 82 in a direction dependent on the direction of rotation of motor shaft 94. In examples, motor 84 is configured to generate the first rotary torque around motor axis MA and linear actuator 90 is configured to produce the linear motion along compression axis CA different from motor axis MA. Thus, actuator assembly 74 allows flexibility in the relative positioning of motor 84, harmonic drive 86, and/or linear actuator 90 as compared to in-line actuators which may be configured to rotate a motor shaft around a motor axis and cause a piston to translate over a compression axis substantially coincident with the motor axis.

Motor 84 is configured to receive electrical power (e.g., from an on-board power generation system) and convert the electrical power into a rotation of motor shaft 94 relative to motor housing 92. Motor 84 may be configured to receive AC (Alternating Current) or DC (Direct Current) electrical power. Motor 84 may comprises a rotor and a stator, and may be configured to produce a rotating field on the stator to generate a torque on the rotor. In some examples, motor 84 is a brushless DC (BLDC) motor configured to accept a DC power input and generate the rotating field on the stator through electronic commutation. Motor 84 may utilize a plurality of permanent magnets on the rotor in order to prompt rotor torque in response to the rotating stator field. Motor shaft 94 may be coupled to the rotor, such that rotation of the rotor in response to the rotor torque causes rotation of motor shaft 94 around motor axis MA. In examples, motor 84 is a configured to provide a rotating or commutated field on the rotor in order to generate the torque.

Control circuitry 96 is configured to control the direction of rotation of motor shaft 94 based on, for example, an input from input device 102. Control circuitry 96 may be configured to cause motor 84 to rotate motor shaft 94 in the first shaft direction R1 or the second shaft direction R2. In examples, control circuitry 96 is configured to control a speed of rotation of motor shaft 94 around motor axis MA. Control circuitry 96 may be configured to, for example, increase or decrease a speed of rotation of motor shaft 94 based on an input from input device 102 to increase or decrease a speed of the linear translation of piston 82 over the compression axis CA. In some examples, control circuitry 96 is configured to receive a signal from a sensor 128 configured to sense an operating parameter of motor shaft 94 such as a speed, position, and/or rotational direction. Control circuitry 96 may be configured to use the sensed operating parameter in order to maintain or determine a needed alteration in the operation of motor 84 to achieve a desired braking operation. Control circuitry 96 may be configured to communicate with other control systems on a vehicle, such as an anti-lock braking system (ABS), a brake control unit (BCU), or other systems.

Figure 5:
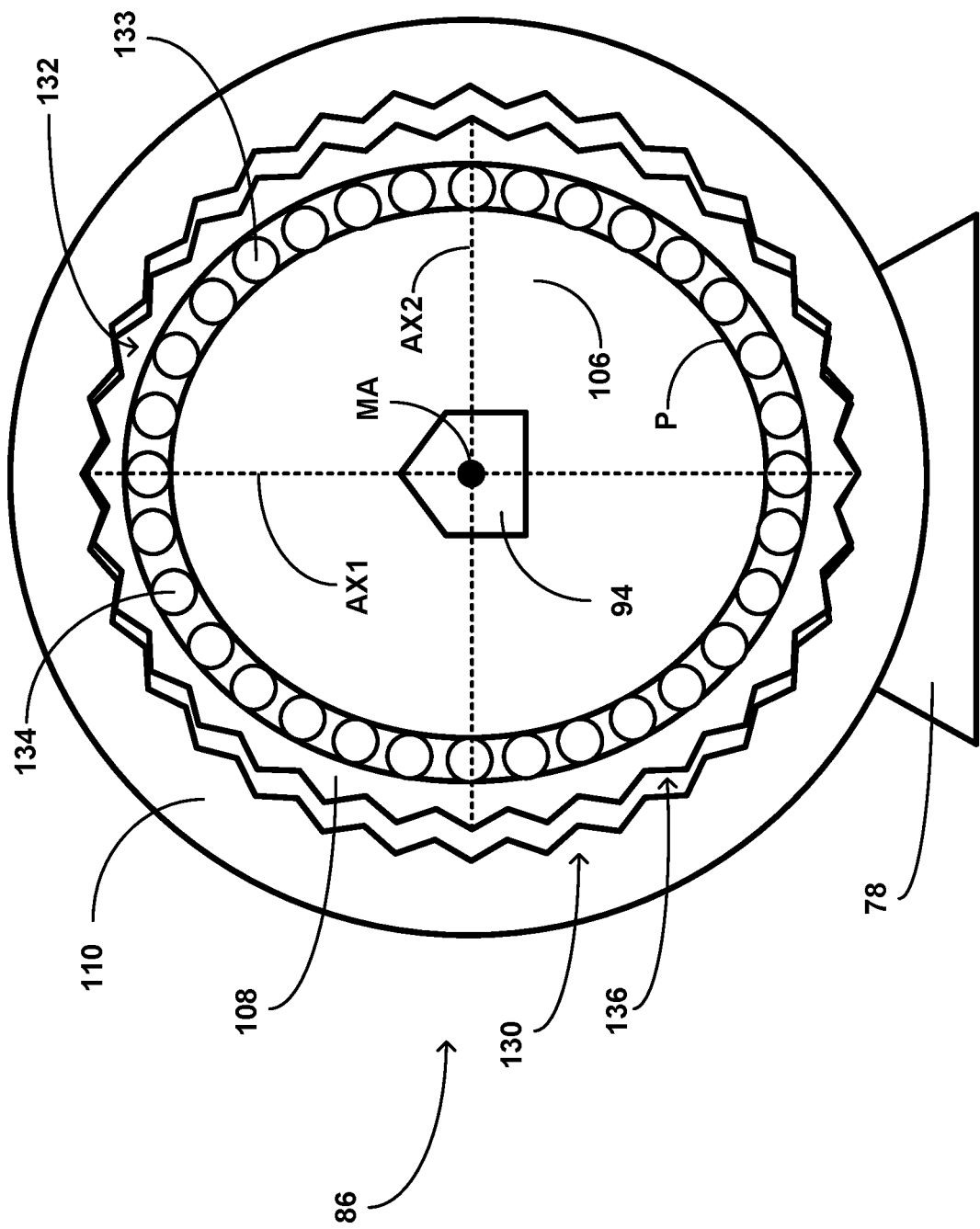
FIG. 5 is a schematic view of an example harmonic drive.

FIG. 5 schematically depicts harmonic drive 86 including harmonic wave generator 106, flexible spline 108, and fixed spline 110. FIGS. 6A-6D depict harmonic drive 86 receiving a first rotary torque T1 on harmonic wave generator 106 and producing a second rotary torque T2 on flexible spline 108 using first rotary torque T1. In FIGS. 6A-6D, the first rotary torque T1 may be torque T1-A (FIG. 4) when the second rotary torque T2 is torque T2-A, or the first rotary torque T1 may be torque T1-B when the second rotary torque T2 is torque T2-B.

Motor shaft 94 is attached to harmonic wave generator 106, such that rotation of motor shaft 94 around motor axis MA causes rotation of harmonic wave generator 106 around motor axis MA. Harmonic wave generator 106 defines a substantially elliptical (e.g., elliptical or nearly elliptical to the extent permitted by manufacturing tolerances) perimeter P around motor axis MA. Fixed spline 110 is configured to remain substantially stationary with respect to actuator body 78 and includes internal teeth 130 around a substantially circular pitch circle. In examples, harmonic wave generator 106 includes a plurality of ball bearings 132 including ball bearing 133 and ball bearing 134. Flexible spline 108 is positioned between harmonic wave generator 106 and fixed spline 110 and includes external teeth 136 configured to mesh with internal teeth 130.

Harmonic drive 86 is configured such that harmonic wave generator 106 and flexible spline 108 may rotate asynchronously. For example, when motor shaft 94 causes rotation of harmonic wave generator 106 around motor axis MA, harmonic drive 86 may be configured such that ball bearings 132 enable harmonic wave generator 106 (and perimeter P) to substantially slip underneath flexible spline 108 as harmonic wave generator 106 rotates around motor axis MA. Flexible spline 108 is configured to flex to substantially conform to perimeter P as harmonic wave generator 106 rotates asynchronously with respect to flexible spline 108. Perimeter P of harmonic wave generator 106 causes flexible spline 108 to define an elliptical pitch circle having a major axis AX1 and a minor axis AX2, with minor axis AX2 defining a length less than major axis AX1.

Harmonic drive 86 is configured such that, as the perimeter P of harmonic wave generator 106 rotates around motor axis MA, flexible spline 108 flexes (e.g., elastically deforms) such that major axis AX1 and minor axis AX2 rotate at the same rotation speed as harmonic wave generator 106. As harmonic wave generator 106 slips underneath flexible spline 108, flexible spline 108 deforms into the elliptical shape and defines the elliptical pitch circle, causing external teeth 136 to mesh with internal teeth 130 substantially along major axis AX1. Further, the elliptical pitch circle causes external teeth 136 to disengage from internal teeth 130 substantially along minor axis AX2. Hence, rotation of motor shaft 94 around motor axis MA causes harmonic wave generator 106 to rotate around motor axis MA, and harmonic wave generator 106 causes flexible spline 108 to flex such that major axis AX1 and minor axis AX2 rotate synchronously with motor shaft 94 and harmonic wave generator 106. Flexible spline 108 flexes (e.g., elastically deforms) to cause external teeth 136 to mesh with internal teeth 130 along major axis AX1, and to cause external teeth 136 to disengage from internal teeth 130 along minor axis AX2 as major axis AX1 and minor axis AX2 rotate.

Flexible spline 108 is configured to rotate around motor axis MA in a rotational direction opposite that of harmonic wave generator 106. In examples, flexible spline 108 defines a number of external teeth 136 which is fewer than the number of internal teeth 130 defined by fixed spline 110. In examples, flexible spline 108 defines a number of external teeth 136 with at least two teeth (e.g., two, three, four or more) fewer than the number of internal teeth 130. The elliptical pitch circle of fixed spline 110 combined with the reduced number of external teeth 136 causes flexible spline 108 rotate in an opposite direction around motor axis MA compared to harmonic wave generator 106. In examples, as harmonic wave generator 106 (and major axis AX1) rotates 180 degrees clockwise, flexible spline 108 rotates counter-clockwise by one tooth of internal teeth 130 relative to fixed spline 110. For every one full rotation clockwise (360 degrees) of harmonic wave generator 106, the flexible spline 108 may move counter-clockwise by two teeth of internal teeth 130 relative to fixed spline 110. Hence, when motor shaft 94 imparts a first torque (T1-A or T1-B) on harmonic wave generator 106 in a first rotational direction, harmonic drive 86 is configured to cause flexible spline 108 to produce a second torque (T2-A or T2-B) in a second rotational direction opposite the first rotational direction.

As an example, FIGS. 6A-6D depict harmonic drive 86 with motor shaft 94 exerting the first torque T1 on harmonic wave generator 106. In the example of FIGS. 6A-6D, first torque T1 causes a rotation of harmonic wave generator 106 in the counter-clockwise direction. Relative to FIG. 6A, first torque T1 has caused harmonic wave generator 106 to rotate 90 degrees counter-clockwise in FIG. 6B, 180 degrees counter-clockwise in FIG. 6C, and 270 degrees counter-clockwise in FIG. 6D.

Figure 6D:
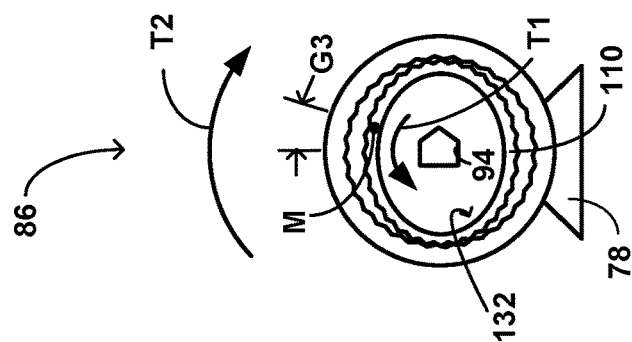
FIG. 6D is a schematic view of the harmonic drive of FIGS. 5 and 6A-6C in a fourth configuration.
Figure 6C:
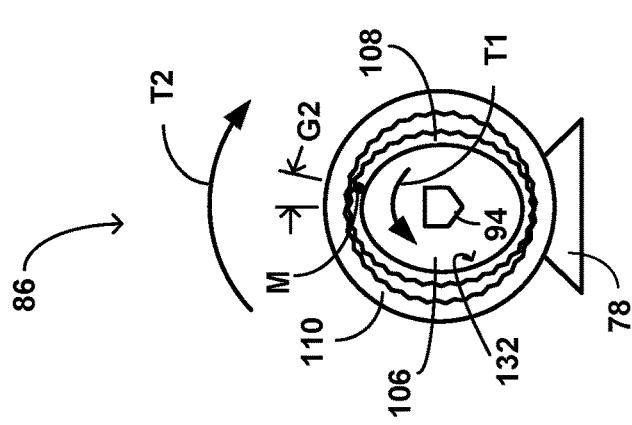
FIG. 6C is a schematic view of the harmonic drive of FIGS. 5, 6A, and 6B in a third configuration.
Figure 6B:
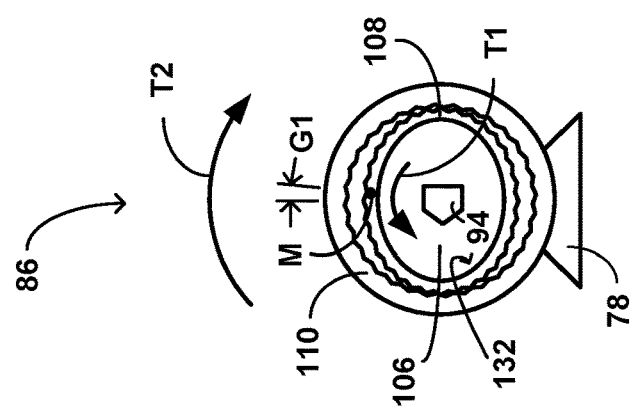
FIG. 6B is a schematic view of the harmonic drive of FIG. 5 and FIG. 6A in a second configuration.
Figure 6A:
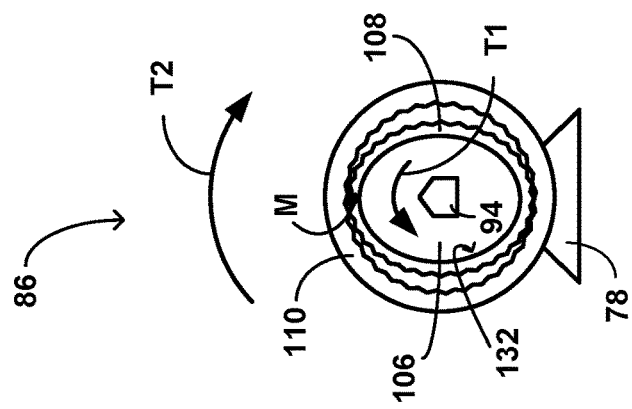
FIG. 6A is a schematic view of the harmonic drive of FIG. 5 in a first configuration.

A fixed point M is depicted on flexible spline 108. Harmonic drive 86 is configured such that, as harmonic wave generator 106 rotates counter-clockwise, fixed point M on flexible spline 108 rotates clockwise. For example, in FIG. 6B, the 90 degree counter-clockwise rotation of harmonic wave generator 106 has caused fixed point M to rotate clockwise over an angular displacement indicated by angle G1. In FIG. 6C, the 180 degree counter-clockwise rotation of harmonic wave generator 106 has caused fixed point M to rotate clockwise over an angular displacement indicated by angle G2, with angle G2 greater than angle G1. In FIG. 6D, the 270 degree counter-clockwise rotation of harmonic wave generator 106 has caused fixed point M to rotate clockwise over an angular displacement indicated by angle G3, with angle G3 greater than angle G2. The rotation of flexible spline 108 (causing rotation of fixed point M) causes flexible spline 108 to produce a second torque T2 having a rotational direction opposite that of first torque T1.

Further, as illustrated at FIGS. 6A-6D, harmonic drive 86 provides a speed reduction from a first rotational speed of first torque T1 to a second rotational speed of second torque T2. In examples, harmonic drive 86 produces a speed reduction from the first rotational speed to the second rotational speed based on the number of external teeth 136 and the number of internal teeth 130. In examples, the speed reduction is substantially equal to the number of external teeth 136 divided by the difference between the number of internal teeth 130 and the number of external teeth 136. Stated similarly, the speed reduction may be substantially equal to N1/(N2−N1), where N1 is the number of external teeth 136 and N1 is the number of internal teeth 130.

In some examples, flexible spline 108 is configured substantially as a thin-walled steel cup with external teeth 136 machined into an outer surface near and/or adjacent to an open end of the cup (e.g., at the "top" of the cup). Flexible spline 108 may include a diaphragm at an end of the cup opposite the open end (e.g., at the "bottom" of the cup). Flexible spline 108 is configured to transmit the second rotary torque generated by the engagement of external teeth 136 and internal teeth 130 to the diaphragm. In examples, harmonic drive 86 is configured to impart the second rotary torque on gear set 88 (FIG. 3, 4) using the diaphragm. In examples, harmonic drive 86 is configured to impart the second rotary torque around the motor axis MA.

Input gear 112 (FIG. 3) may be configured to receive the second rotary torque from the diaphragm of harmonic drive 86. Input gear 112 may define input gear teeth 114 around a pitch circle surrounding an input gear axis, such that a torque on input gear 112 around the input gear axis causes input gear teeth 114 to rotate around the input gear axis. In examples, the input gear axis is substantially parallel to or substantially coaxial with motor axis MA. In examples, input gear 112 is configured to receive the second rotary torque from harmonic drive 86 and rotate around the input gear axis in the second rotational direction of the second rotary torque. Input gear 112 may be configured to rotate in the second rotational direction when motor shaft 94 rotates in the first rotational direction. In examples, actuator assembly 74 is configured such that rotation of motor shaft 94 in the first shaft direction around motor axis MA causes a rotation of input gear 112 in the second shaft direction opposite the first shaft direction, and such that rotation of shaft 94 in the second shaft direction around motor axis MA causes a rotation of input gear 112 in the first shaft direction.

Gear set 88 is configured such that a rotation of input gear 112 causes a rotation of output gear 118. In examples, output gear 118 defines output gear teeth 120 around a pitch circle surrounding an output gear axis, such that a rotation of output gear 118 around the output gear axis causes output gear teeth 120 to rotate around the output gear axis. In examples, the output gear axis of output gear 118 is displaced (e.g., different) from the input gear axis of input gear 112. Hence, gear set 88 may be configured to receive the second rotary torque to cause a rotation of input gear 112 around the input gear axis, and transfer at least some portion of the second rotary torque to output gear 118 to cause a rotation of output gear 118 around an output gear axis different from the input gear axis. In examples, the input gear axis is substantially aligned (e.g., substantially coaxial with) motor axis MA. In examples, the output gear axis is substantially aligned (e.g., substantially coincident with) compression axis CA. Hence, gear set 88 may be configured to substantially transfer torque from the motor axis MA to compression axis CA, to allow for a more compact actuator assembly as compared to in-line actuators where a single axis is substantially coincident with both the motor axis MA and the compression axis CA.

In examples, gear set 88 is configured such that input gear teeth 114 mesh with output gear teeth 120 to cause the rotation of output gear 118. In some examples, gear set 88 is configured such that input gear 112 drives the rotation of output gear 118 without the use of one or more idler gears between input gear 112 and output gear 118. Gear set 88 may be configured such that a rotational speed of input gear 112 is greater than a rotational speed of output gear 118. In examples, input gear 112 defines a number of input gear teeth 114 and output gear 118 defines a number of output gear teeth 120, and the number of input gear teeth 114 is less than the number of output gear teeth 120. Gear set 88 may be configured such that a rotational speed of output gear 118 is reduced from a rotational speed of input gear 112 by a factor substantially equal to the number of input gear teeth 114 divided by the number of output gear teeth 120. Stated similarly, the speed reduction from input gear 112 to output gear 118 may be substantially equal to N3/N4, where N3 is the number of input gear teeth 114 and N4 is the number of output gear teeth 120.

Hence, actuator assembly 74 may be configured such that, when motor 84 generates the first torque (e.g., T1-A or T1-B) at the first rotational speed, harmonic drive 86 may cause a first speed reduction by using the first torque to produce the second torque at the second rotational speed less than the first rotational speed. The first speed reduction may be substantially equal to N1/(N2−N1), where N1 is the number of external teeth 136 and N1 is the number of internal teeth 130. Actuator assembly 74 may be configured such that, when gear set 88 receives the second rotary torque at the second rotational speed, gear set 88 causes a second speed reduction when gear set 88 uses the second rotary torque to produce a rotation of output gear 118. The second speed reduction may be substantially equal to N3/N4, where N3 is the number of input gear teeth 114 and N4 is the number of output gear teeth 120.

In examples, actuator assembly 74 may be configured such that the first speed reduction and the second speed reduction cause an overall speed reduction of at least 80:1, and in some examples at least 150:1. Further, actuator assembly 74 may be configured to cause the overall speed reduction without the use of one or more idler gears between input gear 112 and output gear 118, reducing and/or eliminating gear backlash during alterations in the speed and/or rotational direction of motor shaft 94. In addition, accomplishing the speed reduction using harmonic drive 86 and gear set 88 without the use of idler gears may allow for a more compact actuator assembly as compared to actuators configured to primarily use only a meshed gearbox for speed step-down.

Gear set 88 is configured such that the rotational direction of input gear 112 substantially determines the output gear direction of output gear 118. Actuator assembly 74 is configured such that the rotational direction of motor shaft 94 (e.g., the first shaft direction R1 or the second shaft direction R2) substantially determines the rotational direction of input gear 112. Hence, actuator assembly 74 is configured such that the rotational direction of motor shaft 94 determines the output gear direction of output gear 118. In examples, rotation of motor shaft 94 in first shaft direction R1 causes output gear 118 to rotate in a first output gear direction (e.g., output gear direction R3 (FIG. 4)), and rotation of motor shaft 94 in second shaft direction R2 causes output gear 118 to rotate in a second output gear direction opposite the first output gear direction (e.g., output gear direction R4 (FIG. 4)).

Output gear 118 is configured to transfer rotary motion to linear actuator 90 in either the first output gear direction or the second output gear direction. In examples, output gear 118 is configured to cause a portion of linear actuator 90 (e.g., driver 124) to rotate around compression axis CA. Linear actuator 90 is configured to receive the rotary motion from output gear 118 (in the first output gear direction or second output gear direction) and convert the rotary motion into a linear translation substantially along compression axis CA. In examples, linear actuator 90 is configured to produce the linear translation substantially along compression axis CA when driver 124 rotates substantially around the compression axis CA. In examples, driver 124 is configured to rotate in a first driver direction when output gear 118 transfers rotary motion to driver 124 in the first output gear direction, and configured to rotate in a second driver direction opposite the first driver direction when output gear 118 transfers rotary motion to driver 124 in the second output gear direction.

In examples, screw 126 is configured to linearly translate along compression axis CA when driver 124 rotates around compression axis CA. Linear actuator may be configured such that screw 126 translates in the axial direction A1 when driver 124 rotates in the first driver direction, and such that screw 126 translates in the axial direction A2 when driver 124 rotates in the second driver direction. Hence, actuator assembly 74 may be configured such that the rotational direction of motor shaft 94 determines the rotational direction of driver 124 around compression axis CA, and thereby determines the direction of translation of screw 126. For example, in some examples, when motor 84 causes motor shaft 94 to rotate in the first shaft direction R1, driver 124 causes screw 126 to linearly translate in the direction A1 to increase and/or initiate a compression force on disc stack 58, and when motor 84 causes motor shaft 94 to rotate in the second shaft direction R2, driver 124 causes screw 126 to linearly translate in the direction A2 to decrease and/or substantially eliminate a compression force on disc stack 58. In other examples, when motor 84 causes motor shaft 94 to rotate in the second shaft direction R2, driver 124 causes screw 126 to linearly translate in the direction A1 to increase and/or initiate a compression force on disc stack 58, and when motor 84 causes motor shaft 94 to rotate in the first shaft direction R1, driver 124 causes screw 126 to linearly translate in the direction A2 to decrease and/or substantially eliminate a compression force on disc stack 58.

In examples, the driver 124 is a ball nut and screw 126 is a ball screw. Linear actuator 90 may include a plurality of ball bearings 138 ("actuator ball bearings 138") such as ball bearing 139 and ball bearing 140 (FIG. 3). In some of these examples, linear actuator 90 is configured such that a rotation of driver 124 around compression axis CA exerts a force in the direction A1 or the direction A2 on actuator ball bearings 138, and actuator ball bearings 138 transmit the force to screw 126 causing screw 126 to translate in the direction A1 or A2 respectively. In examples, as shown in FIG. 3, driver 124 defines a helical track 142 ("driver helical track 142") surrounding compression axis CA and screw 126 defines a helical track 144 ("screw helical track 144") surrounding compression axis CA, and linear actuator 90 is configured to confine at least a portion or all of actuator ball bearings 138 within the driver helical track 142 and screw helical track 144. In examples, driver 124 is configured to exert the force on actuator ball bearings 138 using driver helical track 142, and actuator ball bearings 138 are configured to transmit the force to screw 126 using screw helical track 144. In examples, linear actuator 90 includes a ball return 146 configured to allow actuator ball bearings 138 to exit from and return to driver helical track 142 and screw helical track 144 as screw 126 translates in the direction A1 or the direction A2.

Actuator assembly 74 may include an anti-rotation member 148 (FIG. 3) configured to limit rotational movement of screw 126 with respect to actuator body 78, motor housing 92, or some other portion of brake assembly 40 (e.g., torque tube 52). Anti-rotation member 148 may be configured to allow screw 126 to translate in a linear direction (e.g., the direction A1 or the direction A2) while limiting the rotational movement of screw 126. In examples, anti-rotation member 148 is configured to cause screw 126 to substantially resist torques which may be imparted to screw 126 during the rotation of driver 124 by output gear 118. In examples, anti-rotation member 148 is configured to remain substantially stationary with respect to actuator body 78. Actuator body 78 may mechanically support anti-rotation member 148, such that anti-rotation member 148 causes screw 126 to resist torques imparted by driver 124.

Anti-rotation member 148 may include a linear bearing 150 configured to engage screw 126 to substantially maintain screw 126 rotationally stationary with respect to driver 124. Linear bearing 150 may be configured such that, when screw 126 exerts a torque around compression axis CA on linear bearing 150, linear bearing 150 exerts a substantially equal and opposite reaction torque on screw 126 to prevent rotation of screw 126 around compression axis CA. Linear bearing 150 may be configured to translate in a linear direction (e.g., the direction A1 or the direction A2) while limiting the rotational movement of screw 126. In examples, linear bearing 150 includes a plurality of ball bearings 152 ("linear ball bearings 152") such as ball bearing 153 and ball bearing 154. In examples, linear bearing 150 is configured such that, if rotation of driver 124 around compression axis CA imparts a torque to screw 126, linear ball bearings 152 transmit the torque to anti-rotation member 148, causing linear bearing 150 to exert the substantially equal and opposite reaction torque on screw 126.

Linear bearing 150 is configured to allow screw 126 to translate in a linear direction (e.g., the direction A1 or the direction A2) relative to anti-rotation member 148. For example, when driver 124 rotates relative to screw 126 to cause linear motion of screw 126, linear bearing 150 may be configured to offer limited or substantially no resistance to the linear motion while substantially resisting any rotational motion of screw 126 that might be caused by torques imparted to screw 126 by driver 124. In examples, anti-rotation member 148 defines a linear track 156 and screw 126 defines a linear track 158 ("screw linear track 158"), and anti-rotation member 148 is configured to confine linear ball bearings 152 within linear track 156 and screw linear track 158. In examples, linear track 156 and screw linear track 158 are configured to define a path for linear ball bearings 152 substantially parallel to compression axis CA. In examples, actuator assembly 74 is configured such that, when driver 124 exerts a torque around compression axis CA on screw 126, screw linear track 158 transmits the torque to anti-rotation member 148 via linear ball bearings 152 and linear track 156, and anti-rotation member 148 exerts a substantially equal and opposite reaction to screw 126 via linear track 156 and linear ball bearings 152 to substantially limit rotational motion of screw 126.

In examples, screw 126 defines void 129 and may be configured such that anti-rotation member 148 is positioned within void 129. In examples, one of driver 124 or anti-rotation member 148 is positioned within void 129 (e.g., substantially within screw 126) and the other of driver 124 or anti-rotation member 148 is positioned outside of void 129 (e.g., substantially outside of screw 126). For example, in the example of FIG. 3, anti-rotation member 148 is positioned within void 129 and driver 124 is positioned outside of void 129. Screw 126 may include a substantially tubular section defining void 129. Piston 82 may be supported by screw 126 on an end of the substantially tubular section.

Screw 126 includes an inner surface 160 ("screw inner surface 160") defining a boundary of void 129. Anti-rotation member 148 includes an outer surface 162 ("anti-rotation outer surface 162") configured to face screw inner surface 160 when anti-rotation member 148 positions in void 129. In examples, anti-rotation outer surface 162 defines linear track 156 and screw inner surface 160 defines screw linear track 158. In the example of FIG. 3 and in other examples, driver 124 may be configured to substantially surround a portion of screw 126, such that driver 124 is positioned outside of void 129. Driver 124 may include an inner surface 164 ("driver inner surface 164") configured to face screw 126 when driver 124 substantially surrounds the portion of screw 126. In examples, screw 126 includes an outer surface 166 ("screw outer surface 166") configured to face driver inner surface 164 when driver 124 substantially surrounds the portion of screw 126. In examples, driver inner surface 164 defines driver helical track 142 and screw outer surface 166 defines screw helical track 144.

Figure 7:
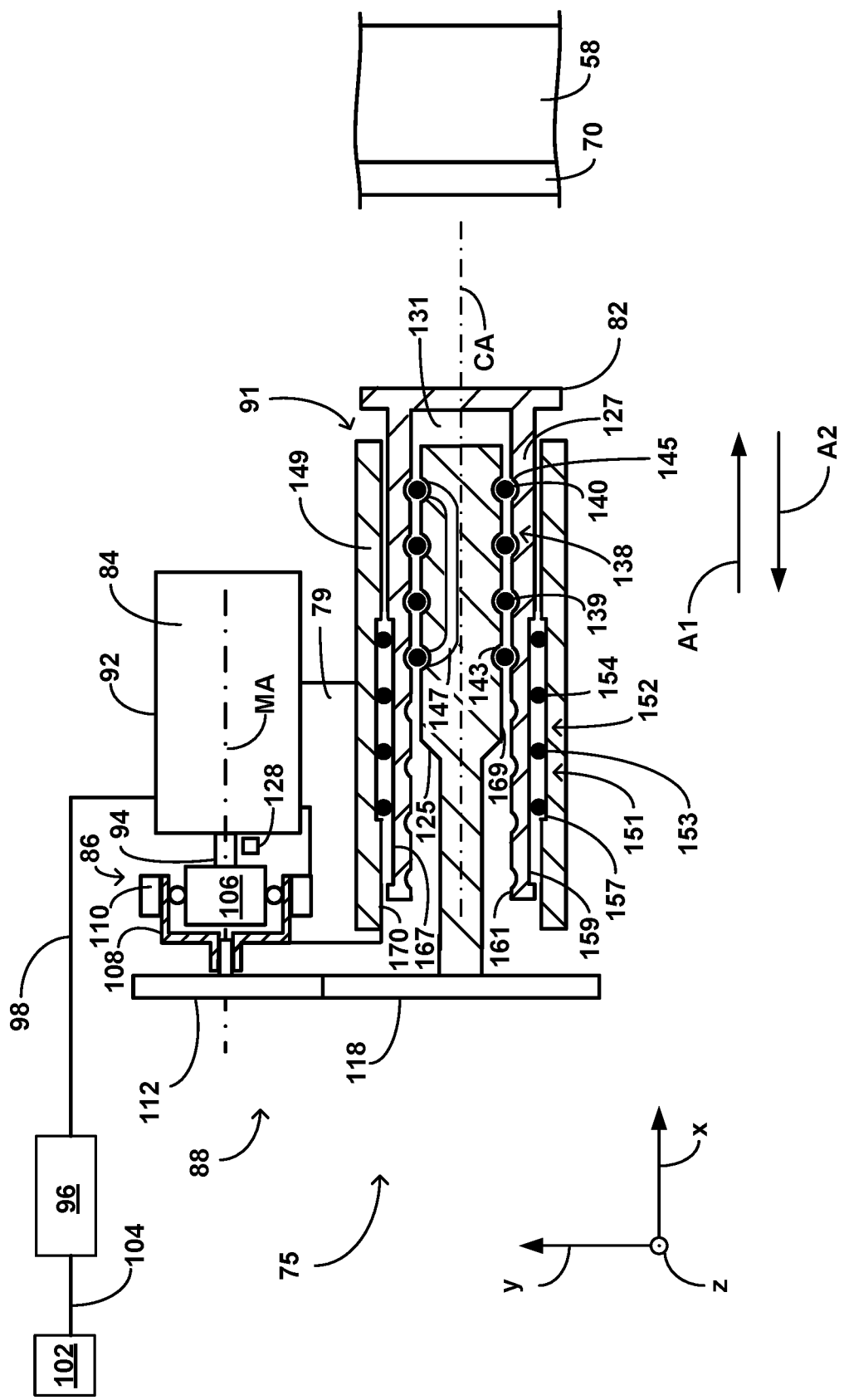
FIG. 7 is a schematic view illustrating an example actuator and an example linear actuator.

FIG. 7 is a conceptual illustration of another example actuator assembly 75 including actuator body 79, linear actuator 91, and anti-rotation member 149. Linear actuator 91 includes driver 125 and screw 127 and defines a void 131. Linear actuator 91 is configured such that driver 125 is positioned within void 131 and anti-rotation member 149 is positioned outside of void 131 (e.g., partially and/or substantially surrounding screw 127). FIG. 7 illustrates part of actuator assembly 75 in cross-section and parts as functional block diagram, with reference to the x-y-z axes shown. Actuator assembly 75 may be an example of actuator assembly 73, 74, actuator body 79 may be an example of actuator body 77, 78, linear actuator 91 may be an example of linear actuator 90, driver 125 may be an example of driver 124, screw 127 may be an example of screw 126, and anti-rotation member 149 may be an example of anti-rotation member 148 (FIG. 2). Actuator assembly 75 further includes motor 84, motor shaft 94, harmonic drive 86, input gear 112, output gear 118, control circuitry 96, and input device 102.

Output gear 118 is configured to rotate driver 125 within void 131 when output gear 118 rotates. Driver 125 is configured to rotate substantially within a void 131 defined by screw 127 to cause a linear translation of screw 127 in the axial direction A1 or the axial direction A2. Linear actuator 91 includes an anti-rotation member 149 surrounding screw 127 and configured to limit rotational movement of screw 127 as driver 125 rotates around screw 127. In examples, output gear 118 is configured to cause driver 125 to rotate within void 131 around compression axis CA. Screw 127 may include a substantially tubular section defining void 131. Piston 82 may be supported by screw 127 on an end of the substantially tubular section. In examples, output gear 118 is configured to cause driver 125 to rotate in the first driver direction when output gear 118 rotates in the first output gear direction, and configured to cause driver 125 to rotate in the second driver direction when output gear 118 rotates in the second output gear direction.

Screw 127 is configured to linearly translate along compression axis CA when driver 125 rotates around compression axis CA. Linear actuator 91 may be configured such that screw 127 translates in the axial direction A1 when driver 125 rotates in the first driver direction, and such that screw 127 translates in the axial direction A2 when driver 125 rotates in the second driver direction. Hence, actuator assembly 75 may be configured such that the rotational direction of motor shaft 94 determines the rotational direction of driver 125 around compression axis CA, and thereby determines the direction of translation of screw 127.

In some examples, driver 125 is a ball nut and screw 127 is a ball screw. Linear actuator 91 may be configured such that a rotation of driver 125 around compression axis CA exerts a force in the direction A1 or the direction A2 on actuator ball bearings 138, and actuator ball bearings 138 transmit the force to screw 127 causing screw 127 to translate in the direction A1 or A2 respectively. In examples, as shown in FIG. 7, driver 125 defines a helical track 143 ("driver helical track 143") surrounding compression axis CA and screw 127 defines a helical track 145 ("screw helical track 145") surrounding compression axis CA, and linear actuator 91 is configured to confine at least a portion or all of actuator ball bearings 138 within the driver helical track 143 and screw helical track 145. Driver 125 can be configured to exert the force on actuator ball bearings 138 using driver helical track 143, and actuator ball bearings 138 are configured to transmit the force to screw 127 using screw helical track 145. In examples, linear actuator 91 includes a ball return 147 configured to allow actuator ball bearings 138 to exit from and return to driver helical track 143 and screw helical track 145 as screw 127 translates in the direction A1 or the direction A2.

Screw 127 includes an inner surface 161 ("screw inner surface 161") defining a boundary of void 131. In examples, screw inner surface 161 defines screw helical track 145. Driver 125 may include an outer surface 169 ("driver outer surface 169") configured to face screw 127 when screw 127 substantially driver 125. In examples, driver outer surface 169 defines driver helical track 143.

Anti-rotation member 149 is configured to limit rotational movement of screw 127 with respect to actuator body 79, motor housing 92, or some other portion of brake assembly 40 (e.g., torque tube 52). Anti-rotation member 149 may be configured to allow screw 127 to translate in a linear direction (e.g., the direction A1 or the direction A2) while limiting the rotational movement of screw 127. Anti-rotation member 149 may be configured to cause screw 127 to substantially resist torques which may be imparted to screw 127 during the rotation of driver 125 by output gear 118. In examples, anti-rotation member 149 is configured to remain substantially stationary with respect to actuator body 79. Actuator body 79 may mechanically support anti-rotation member 149, such that anti-rotation member 149 causes screw 127 to resist torques imparted by driver 125.

Anti-rotation member 149 may include a linear bearing 151 configured to engage screw 126 to substantially maintain screw 126 rotationally stationary with respect to driver 124. Linear bearing 151 may be configured such that, when screw 127 exerts a torque around compression axis CA on linear bearing 151, linear bearing 151 exerts a substantially equal and opposite reaction torque on screw 127 to prevent rotation of screw 127 around compression axis CA. Linear bearing 151 may be configured to translate in a linear direction (e.g., the direction A1 or the direction A2) while limiting the rotational movement of screw 127. Linear bearing 151 may include linear ball bearings 152 with linear bearing 151 is configured such that, if rotation of driver 125 around compression axis CA imparts a torque to screw 127, linear ball bearings 152 transmit the torque to anti-rotation member 149, causing linear bearing 151 to exert the substantially equal and opposite reaction torque on screw 127.

Linear bearing 151 is configured to allow screw 127 to translate in a linear direction (e.g., the direction A1 or the direction A2) relative to anti-rotation member 149. For example, when driver 125 rotates relative to screw 127 to cause linear motion of screw 127, linear bearing 151 may be configured to offer limited or substantially no resistance to the linear motion while substantially resisting any rotational motion of screw 127 that might be caused by torques imparted to screw 127 by driver 125. In examples, anti-rotation member 149 defines a linear track 157 and screw 127 defines a linear track 159 ("screw linear track 159"), and anti-rotation member 149 is configured to confine linear ball bearings 152 within linear track 157 and screw linear track 159. In examples, linear track 157 and screw linear track 159 are configured to define a path for linear ball bearings 152 substantially parallel to compression axis CA. In examples, actuator assembly 75 is configured such that, when driver 124 exerts a torque around compression axis CA on screw 127, screw linear track 159 transmits the torque to anti-rotation member 149 via linear ball bearings 152 and linear track 157, and anti-rotation member 149 exerts a substantially equal and opposite reaction torque to screw 127 via linear track 157 and linear ball bearings 152 to substantially limit rotational motion of screw 127.

Anti-rotation member 148 may include an inner surface 170 ("anti-rotation inner surface 170") configured to face an outer surface 167 of screw 127 ("screw outer surface 167") when anti-rotation member 149 positions in void 131. In examples, anti-rotation inner surface 170 defines linear track 157 and screw outer surface 167 defines screw linear track 159.

Brake assembly 40 may include any suitable number of actuators such as actuator assembly 73, 74, and/or 75 configured to exert and/or increase a compression force on disc stack 58, and/or configured to reduce and/or eliminate the compression force on disc stack 58. The actuators may be arranged within brake assembly 40 in any suitable arrangement. In examples, brake assembly 40 includes a plurality of actuators arranged around a perimeter surrounding wheel axis A. Two or more actuators may be configured to translate a respective piston substantially simultaneously based on a command issued by control circuitry 96 to the two or more actuators, and/or may be configured to translate the respective pistons substantially individually based on individual command issued by control circuitry 96 to an individual actuator.

Actuator assembly 74, wheel 10, brake assembly 40, and the components thereof can be formed using any suitable technique. Actuator assembly 74, wheel 10, brake assembly 40, and the components thereof may be forged, casted, made from bar stock, additive manufactured (e.g., three-dimensionally (3D) printed), extruded, drawn, or be produced using other suitable methods. In some examples, actuator assembly 74, wheel 10, brake assembly 40, and the components thereof may be machined to define the configurations described herein. In other examples, actuator assembly 74, wheel 10, brake assembly 40, and the components thereof may be formed without having to be substantially machined.

In some examples, wheel 10 may be finish machined from a near-net-shaped aluminum forging and contain an axial assembly and/or wheel rim for assembly of brake assembly 40 and/or actuator assembly 74 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Control circuitry 96 may comprise a processor, memory, and, in some examples, input/output I/O peripherals. In examples, control circuitry 96 may include any one or more of a microcontroller (MCU), e.g., a computer on a single integrated circuit containing a processor core, memory, and programmable input/output peripherals, a microcontroller (µP), e.g., a central processing unit (CPU) on a single integrated circuit (IC), a digital signal processor (DSP), an application specific integrated circuit (ASIC), a field-programmable gate array (FPGA), a system on chip (SoC) or equivalent discrete or integrated logic circuitry. Control circuitry 96 may include integrated circuitry, i.e., integrated control circuitry, and the integrated control circuitry may be realized as fixed hardware processing circuitry, programmable processing circuitry and/or a combination of both fixed and programmable processing circuitry. The memory may include any volatile or non-volatile media, such as a random access memory (RAM), read only memory (ROM), non-volatile RAM (NVRAM), electrically erasable programmable ROM (EEPROM), flash memory, and the like. In addition, in some examples, the memory or another memory may also store executable instructions for causing the one or more controllers described herein to perform the actions attributed to them.

Input device 102 may have any suitable configuration. For example, input device 102 may include a foot pedal, a button or keypad, a speaker configured to receive voice commands from a user, a display, such as a liquid crystal (LCD), light-emitting diode (LED), or organic light-emitting diode (OLED). In some examples, input device 102 may include a touch screen. Input device 102 is configured to receive user input, e.g., in the form of placing a foot pedal in a specific position and/or pressing one or more buttons on a keypad or via a touch screen, which may be a user input selecting one or more actuators for actuation. In some examples, input device 102 is also configured to display information, such as one or more indications providing information on the actuation of brake assembly 40.

Communication links 98, 104 may be hard-line and/or wireless communications links. In some examples, communication links 98, 104 may comprise some portion of control circuitry 96. In some examples, communication links 98, 104 comprise a wired connection, a wireless Internet connection, a direct wireless connection such as wireless LAN, Bluetooth™, Wi-Fi™, and/or an infrared connection. Communication links 98, 104 may utilize any wireless or remote communication protocol.

Brake discs described herein, including rotor discs 60, 61, 62, 63 and stator discs 64, 65, 66, may be manufactured from any suitable material. In some examples, the brake discs described herein may be manufactured from a metal or a metal alloy, such as a steel alloy. In some examples, the brake discs may be manufactured using a ceramic material, such as a ceramic composite. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multilayer structure.

Figure 8:
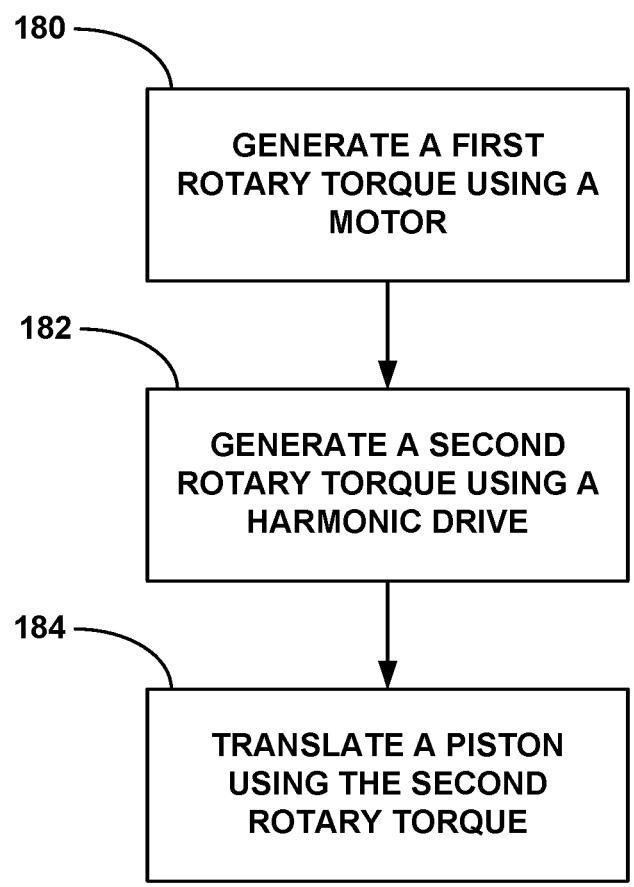
FIG. 8 is a flow diagram illustrating an example technique of compressing a disc stack.

FIG. 8 is a flow diagram illustrating an example technique for compressing a disc stack in a brake assembly. While the technique is described with reference to brake assembly 40 and wheel 10 described herein, the technique may be used with other examples components described herein.

The technique includes generating a first rotary torque (e.g., T1-A, T1-B) using motor 84 of actuator assembly 73, 74, 75 (180). Actuator assembly 73, 74, 75 may include actuator body 77, 78, 79 configured to remain substantially stationary with respect to some portion of brake assembly 40, such as torque tube 52. Motor 84 may include motor housing 92 configured to remain substantially stationary with respect to actuator body 77, 78, 79. Motor 84 may be configured to generate the first rotary torque by rotating motor shaft 94 relative to motor housing 92. In examples, actuator assembly 73, 74, 75 is configured to generate the first rotary torque in response to a braking signal received from control circuitry 96. Control circuitry 96 may be configured to receive a user input from input device 102 and transmit the braking signal to actuator assembly 73, 74, 75 based on the user input.

The technique may include generating the first rotary torque at a first rotational speed and in a first rotational direction. In examples, motor housing 92 defines a motor axis MA, and motor 84 is configured to generate the first rotary torque around the motor axis MA. Motor housing 92 may be configured to rotate motor shaft 94 around motor axis MA to generate the first rotary torque. Motor 84 may be configured to rotate motor shaft 94 around motor axis MA in a first shaft direction R1 or in a second shaft direction R2 opposite first shaft direction R1 to generate the first rotary torque.

The technique includes generating a second rotary torque using harmonic drive 86 (182). Harmonic drive 86 may be configured to generate the second rotary torque using the first rotary torque produced by motor 84. Harmonic drive 86 may generate the second rotary torque at a second rotational speed less than the first rotational speed and in a second rotational direction opposite the first rotation direction.

In examples, harmonic drive 86 includes harmonic wave generator 106, flexible spline 108 defining external teeth 136, and fixed spline 110 defining internal teeth 130. Fixed spline 110 may define a substantially circular pitch circle and be configured to remain substantially stationary with respect to actuator body 78, motor housing 92, and/or another portion of brake assembly 40 such as torque tube 52. Harmonic wave generator 106 may be configured to cause flexible spline 108 to define an elliptical pitch circle. The technique may include using the first rotary torque to cause a rotation of harmonic wave generator 106. The technique may include causing external teeth 136 to mesh with internal teeth 130 substantially at a major axis of the elliptical pitch circle as harmonic wave generator 106 rotates. The technique may include generating the second rotary torque using flexible spline 108. Flexible spline 108 may be configured to generate the second rotary torque around the motor axis MA. In examples, the technique includes using the harmonic drive to generate the second rotary torque at a second rotational speed using the first rotary torque at a first rotational speed, where the second rotational speed is less than the first rotational speed.

The technique may include rotating output gear 118 of gear set 88 using the second rotary torque. In examples, harmonic drive 86 is configured to cause the rotation of input gear 112 to cause the rotation of output gear 118. Input gear 112 may define input gear teeth 114 and output gear 118 may define output gear teeth 120. In examples, input gear 112 is configured to mesh input gear teeth 114 with output gear teeth 120. In examples, gear set 88 is configured to rotate input gear 112 around an input gear axis and rotate output gear 118 around an output gear axis displaced (e.g., different) from the input gear axis.

The technique includes translating piston 82 using the second rotary torque (184). The technique may include causing linear actuator 90, 91 to generate a linear motion to translate piston 82 using the second rotary torque. In examples, output gear 118 is configured to cause a rotation of driver 124 when the second rotary torque causes a rotation of output gear 118. Linear actuator 90, 91 may include screw 126, 127 configured to linearly translate when driver 124, 125 rotates. In examples, screw 126, 127 is configured to linearly translate along compression axis CA. Compression axis CA may be substantially coincident with the output gear axis of output gear 118. In some examples, driver 124 is configured to rotate substantially around a portion of screw 126 to cause the linear translation. In some examples, driver 125 may be configured to rotate within void 131 defined by screw 127 to cause the linear translation.

In examples, the technique includes causing screw 126, 127 to initiate and/or increase a compression force on disc stack 58 when motor 84 rotates motor shaft 94 in the first shaft direction R1. Actuator assembly 73, 74, 75 may be configured to cause output gear 118 to rotate in a first output gear direction around the output gear axis when motor 84 rotates motor shaft 94 in the first shaft direction R1. Actuator may be configured to cause driver 124, 125 to rotate in a first driver direction when output gear 118 rotates in the first output gear direction. Driver 124, 125 may be configured to cause screw 126 to translate in a first axial direction A1 to initiate and/or increase the compression on disc stack 58 when driver 124, 125 rotates in the first driver direction. In examples, the technique includes causing screw 126, 127 to decrease and/or substantially eliminate a compression force on disc stack 58 when motor 84 rotates motor shaft 94 in the second shaft direction R2. Actuator assembly 73, 74, 75 may be configured to cause output gear 118 to rotate in a second output gear direction opposite the first output gear direction when motor 84 rotates motor shaft 94 in the second shaft direction R2. Actuator may be configured to cause driver 124, 125 to rotate in a second driver direction opposite the first driver direction when output gear 118 rotates in the second output gear direction. Driver 124, 125 may be configured to cause screw 126, 127 to translate in a second axial direction A2 to decrease and/or substantially eliminate the compression on disc stack 58 when driver 124, 125 rotates in the second driver direction.

The present disclosure includes the following examples.

Example 1: A brake assembly comprising: a brake disc stack; an actuator assembly comprising: an electric motor configured to generate a first rotary torque around a motor axis; a harmonic drive configured to generate a second rotary torque in response to the first rotary torque; a gear set comprising an output gear configured to rotate in response to the second rotary torque; and a linear actuator mechanically coupled with the gear set, wherein the linear actuator is configured to generate linear motion along a compression axis and cause a piston to compress the brake disc stack when the output gear rotates, wherein the compression axis is different than the motor axis.

Example 2: The brake assembly of example 1, wherein the electric motor is configured to generate the first rotary torque at first rotary speed and in a first rotary direction, and wherein the harmonic drive is configured to generate the second rotary torque at a second rotary speed and in a second rotary direction, wherein the second rotary speed is less than the first rotary speed and the second rotary direction is opposite the first rotary direction.

Example 3: The brake assembly of example 1 or 2, wherein the output gear is configured to cause a rotation of the linear actuator, and wherein the linear actuator is configured to generate the linear motion when the output gear causes the rotation.

Example 4: The brake assembly of any of examples 1-3, wherein the linear actuator includes a screw configured to translate and a driver configured to rotate around the screw, wherein the rotation of the driver causes the screw to generate the linear motion along the compression axis.

Example 5: The brake assembly of example 4, wherein the linear actuator comprises a plurality of ball bearings, wherein the driver is configured to cause the ball bearings to impart a force on the screw to cause the screw to generate the linear motion along the compression axis.

Example 6: The brake assembly of any of examples 1-5, wherein the gear set includes a input gear configured to rotate around the motor axis, wherein the harmonic drive is configured to cause the rotation of the input gear, and wherein the output gear is configured to rotate around the compression axis when the input gear rotates around the motor axis.

Example 7: The brake assembly of example 6, wherein the output gear is meshed with the input gear.

Example 8: The brake assembly of example 6 or 7, wherein a portion of the linear actuator is configured to rotate synchronously with the output gear.

Example 9: The brake assembly of any of examples 1-8, wherein the harmonic drive includes a fixed spline defining internal teeth and a flexible spline defining external teeth, wherein the flexible spline is configured to mesh the external teeth with the internal teeth to generate the second rotary torque.

Example 10: The brake assembly of any of examples 1-9, wherein the harmonic drive includes a harmonic wave generator and a flexible spline, wherein the electric motor is configured to cause a rotation of the harmonic wave generator using the first rotary torque, and wherein the harmonic wave generator is configured to cause the flexible spline to define an elliptical pitch circle having a major axis longer than a minor axis.

Example 11: The brake assembly of any of examples 1-10, wherein the linear actuator is configured to substantially prevent a rotation of the piston around the compression axis when the linear actuator generates the linear motion along the compression axis.

Example 12: The brake assembly of any of examples 1-11, wherein: the harmonic drive includes a flexible spline and is configured to generate the second rotary torque using a flexible spline, the gear set includes an input gear meshed with the output gear, the input gear being is configured to rotate synchronously with the flexible spline, and the linear actuator includes a driver configured to rotate synchronously with the output gear to cause a screw of the linear actuator to generate the linear motion along the compression axis.

Example 13: The brake assembly of any of examples 1-12, wherein: the electric motor comprises a motor housing and a motor shaft, and the electric motor is configured to generate the first rotary torque by at least rotating the motor shaft relative to the motor housing, and the harmonic drive includes: a harmonic wave generator, wherein the motor shaft is configured to cause the harmonic wave generator to rotate synchronously with the motor shaft; a fixed spline configured to remain substantially stationary with respect to the motor housing and defining internal gear teeth around a substantially circular pitch circle; and a flexible spline between the harmonic wave generator and the fixed spline, wherein: the harmonic wave generator is configured to cause the flexible spline to define a substantially elliptical pitch circle having a major axis longer than a minor axis, the flexible spline defines external gear teeth over the elliptical pitch circle, and the flexible spline is configured to cause the external gear teeth to mesh with the internal gear teeth of the fixed spline to cause the flexible spline to generate the second rotary torque.

Example 14: The brake assembly of any of examples 1-13, further comprising a torque tube, wherein the disc stack comprises one or more rotor discs configured to rotate around the torque tube and one or more stator discs configured to remain rotationally stationary with respect to the torque tube, and wherein the piston is configured to cause the one or more rotor discs and the one or more stator discs to translate over the torque tube when the piston compresses the disc stack.

Example 15: A brake assembly comprising: a disc stack; a piston configured to compress the disc stack; an electric motor including a motor housing and a motor shaft, wherein the electric motor is configured to rotate the motor shaft around a motor axis at a first speed and in a first direction relative to the motor housing; a harmonic drive mechanically engaged with the motor shaft, wherein the harmonic drive is configured to cause an flexible spline to rotate around the motor axis at a rotational speed less than the first speed and in a second direction opposite the first direction; an output gear configured to rotate around a compression axis, wherein the flexible spline is configured to cause the rotation of the output gear; and a linear actuator comprising a driver and a screw, wherein the output gear is configured to cause a rotation of the driver, and wherein the rotation of the driver causes the screw to translate relative to the motor housing along the compression axis to cause the piston to compress the disc stack.

Example 16: The brake assembly of example 15, wherein the output gear is configured to cause a rotation of the driver around the compression axis.

Example 17: The brake assembly of example 15 or 16, further comprising an input gear, wherein the input gear is configured to rotate synchronously with the flexible spline around the motor axis.

Example 18: The brake assembly of example 17, wherein the input gear is meshed with the output gear.

Example 19: A method comprising: generating a first rotary torque around a motor axis using an electric motor, producing a second rotary torque in response to the first rotary torque using a harmonic drive; rotating an output gear of a gear set using the second rotary torque; and causing a linear actuator to generate a linear motion along a compression axis using the rotation of the output gear, wherein the compression axis is different that the motor axis; and causing the piston to compress the disc stack using the linear motion of the linear actuator.

Example 20: The method of example 19, further comprising: rotating an input gear around the motor axis using the second rotary torque; and rotating the output gear around the compression axis using the input gear, wherein the input gear is meshed with the output gear.

Various examples have been described. These and other examples are within the scope of the following claims.

What is claimed is:

1. A brake assembly comprising:
a brake disc stack;
an actuator assembly comprising:
an electric motor configured to generate a first rotary torque around a motor axis using a motor shaft;
a harmonic drive configured to receive the first rotary torque from the motor shaft and configured to generate a second rotary torque in response to the first rotary torque;
a gear set comprising,
an input gear configured to rotate around the motor axis in response to the second rotary torque, and
an output gear meshed with the input gear, the output gear configured to rotate around a compression axis different than the motor axis;
a linear actuator comprising a driver and a screw,
wherein the output gear is configured to cause a rotation of the driver around the compression axis,
wherein the rotation of the driver causes the screw to translate along the compression axis to cause a piston to compress the brake disc stack, and
wherein the linear actuator includes an anti-rotation member; and
a plurality of ball bearings between the anti-rotation member and the screw,
wherein the plurality of ball bearings is configured to prevent a rotation of the piston around the compression axis when the output gear causes the rotation of the driver.

2. The brake assembly of claim 1, wherein the electric motor is configured to generate the first rotary torque at first rotary speed and in a first rotary direction, and wherein the harmonic drive is configured to generate the second rotary torque at a second rotary speed and in a second rotary direction, wherein the second rotary speed is less than the first rotary speed and the second rotary direction is opposite the first rotary direction.

3. The brake assembly of claim 1, wherein the linear actuator comprises a plurality of actuator ball bearings, wherein the driver is configured to cause one or more of the actuator ball bearings to impart a force on the screw to cause the screw to generate the linear motion along the compression axis.

4. The brake assembly of claim 1, wherein the input gear is configured to receive the second rotary torque from the harmonic drive.

5. The brake assembly of claim 1, wherein a portion of the linear actuator is configured to rotate synchronously with the output gear.

6. The brake assembly of claim 1, wherein the harmonic drive includes a fixed spline defining internal teeth and a flexible spline defining external teeth, wherein the flexible spline is configured to mesh the external teeth with the internal teeth to generate the second rotary torque.

7. The brake assembly of claim 1, wherein the harmonic drive includes a harmonic wave generator and a flexible spline, wherein the electric motor is configured to cause a rotation of the harmonic wave generator using the first rotary torque, and wherein the harmonic wave generator is configured to cause the flexible spline to define an elliptical pitch circle having a major axis longer than a minor axis.

8. The brake assembly of claim 1,
wherein the plurality of ball bearings is configured to transmit a reaction torque to substantially prevent a rotation of the piston around the compression axis when the output gear causes the rotation of the driver.

9. The brake assembly of claim 1, wherein:
the harmonic drive includes a flexible spline and is configured to generate the second rotary torque using the flexible spline,
the input gear is configured to rotate synchronously with the flexible spline, and the driver is configured to rotate synchronously with the output gear.

10. The brake assembly of claim 1, wherein:
the electric motor comprises a motor housing and the electric motor is configured to generate the first rotary torque by at least rotating the motor shaft relative to the motor housing, and
the harmonic drive includes:
a harmonic wave generator configured to rotate synchronously with the motor shaft;
a fixed spline configured to remain substantially stationary with respect to the motor housing and defining internal gear teeth around a substantially circular pitch circle; and
a flexible spline between the harmonic wave generator and the fixed spline, wherein:
the harmonic wave generator is configured to cause the flexible spline to define a substantially elliptical pitch circle having a major axis longer than a minor axis,
the flexible spline defines external gear teeth over the elliptical pitch circle, and
the flexible spline is configured to cause the external gear teeth to mesh with the internal gear teeth of the fixed spline to cause the flexible spline to generate the second rotary torque.

11. The brake assembly of claim 1, further comprising a torque tube, wherein the brake disc stack comprises one or more rotor discs configured to rotate around the torque tube and one or more stator discs configured to remain rotationally stationary with respect to the torque tube, and wherein the piston is configured to cause the one or more rotor discs and the one or more stator discs to translate over the torque tube when the piston compresses the brake disc stack.

12. The brake assembly of claim 1,
wherein the motor shaft is configured to generate the first rotary torque at a first rotary speed and in a first rotary direction,
wherein the harmonic drive includes a harmonic wave generator, a fixed spline configured to remain substantially stationary with respect to a motor housing of the electric motor, and a flexible spline between the harmonic wave generator and the fixed spline, and
wherein the harmonic wave generator is configured to receive the first rotary torque at the first rotary speed and in the first rotary direction.

13. The brake assembly of claim 1, wherein the screw includes an inner surface defining a boundary of a void, and wherein the anti-rotation member is positioned within the void and the driver is positioned outside of the void, such that the screw is positioned between the anti-rotation member and the void.

14. The brake assembly of claim 1, wherein the screw includes an inner surface defining a boundary of a void, and where the driver is positioned within the void and the anti-rotation member is positioned outside of the void, such that the screw is positioned between the anti-rotation member and the void.

15. A brake assembly comprising:
a disc stack;
a piston configured to compress the disc stack;
an electric motor including a motor housing and a motor shaft, wherein the electric motor is configured to rotate the motor shaft around a motor axis to generate a first rotary torque at a first speed and in a first direction relative to the motor housing;
a harmonic drive including a harmonic wave generator configured to receive the first rotary torque, wherein the motor shaft is attached to the harmonic wave generator, and wherein the harmonic drive is configured to cause a flexible spline to rotate around the motor axis to generate a second rotary torque at a rotational speed less than the first speed and in a second direction opposite the first direction;
an input gear configured to rotate around the motor axis in response to the second rotary torque;
an output gear meshed with the input gear and configured to rotate around a compression axis different that the motor axis;
a linear actuator comprising a driver and a screw, wherein the output gear is configured to cause a rotation of the driver around the compression axis,
wherein the rotation of the driver causes the screw to translate relative to the motor housing along the compression axis to cause the piston to compress the disc stack, and
wherein the linear actuator includes an anti-rotation member; and
a plurality of ball bearings between the anti-rotation member and the screw,
wherein the plurality of ball bearings is configured to prevent a rotation of the piston around the compression axis when the output gear causes the rotation of the driver.

16. The brake assembly of claim 15, wherein the output gear is configured to rotate synchronously with the driver around the compression axis.

17. The brake assembly of claim 15, wherein the input gear is configured to rotate synchronously with the flexible spline around the motor axis.

18. The brake assembly of claim 17, wherein the input gear is meshed with the output gear.

19. The brake assembly of claim 15,
wherein the harmonic wave generator is configured to receive the first rotary torque at the first rotary speed and in the first rotary direction, the harmonic drive including a fixed spline configured to remain substantially stationary with respect to a motor housing of the electric motor and the flexible spline between the harmonic wave generator and the fixed spline.

20. A method comprising:
generating a first rotary torque around a motor axis using a motor shaft of an electric motor;
producing a second rotary torque in response to the first rotary torque using a harmonic drive, wherein the harmonic drive receives the first rotary torque from the motor shaft;
rotating an input gear of a gear set around the motor axis using the second rotary torque;
rotating an output gear of the gear set around a compression axis different than the motor axis, wherein the output gear is meshed with the input gear; and
causing a linear actuator comprising a driver and a screw to generate a linear motion along the compression axis by at least causing a rotation of the driver around the compression axis using the rotation of the output gear;
causing the screw to translate along the compression axis to cause a piston to compress a disc stack;
preventing, using a plurality of ball bearings between an anti-rotation member and the screw, a rotation of the piston around the compression axis when the output gear causes the rotation of the driver.

* * * * *